US008562353B2

(12) United States Patent
Bélisle et al.

(10) Patent No.: US 8,562,353 B2
(45) Date of Patent: Oct. 22, 2013

(54) METHOD OF REPRESENTING INFORMATION

(75) Inventors: Denis Bélisle, Sherbrooke (CA); Johanne Deschênes, Sherbrooke (CA)

(73) Assignee: Societe de commercialisation des produits de la recherche appliquee—Socpra Sciences Sante et Humaines S.E.C., Sherbrooke, QC, CA (US)

( * ) Notice: Subject to any disclaimer, the term of this patent is extended or adjusted under 35 U.S.C. 154(b) by 1692 days.

(21) Appl. No.: 11/976,469

(22) Filed: Oct. 25, 2007

(65) Prior Publication Data
US 2008/0126099 A1 May 29, 2008

Related U.S. Application Data

(60) Provisional application No. 60/862,913, filed on Oct. 25, 2006, provisional application No. 60/855,046, filed on Oct. 26, 2006.

(30) Foreign Application Priority Data

Oct. 25, 2006 (CA) ........................................ 2565693

(51) Int. Cl.
*G09B 21/009* (2006.01)
(52) U.S. Cl.
USPC .......................................................... 434/112
(58) Field of Classification Search
USPC ................................................. 434/112, 156
See application file for complete search history.

(56) References Cited

U.S. PATENT DOCUMENTS

| | | | | |
|---|---|---|---|---|
| 4,546,383 | A * | 10/1985 | Abramatic et al. | 348/14.15 |
| 5,882,202 | A * | 3/1999 | Sameth et al. | 434/157 |
| 5,938,447 | A * | 8/1999 | Kirksey | 434/169 |
| 6,116,907 | A * | 9/2000 | Baker et al. | 434/156 |
| 6,377,925 | B1 * | 4/2002 | Greene et al. | 704/271 |
| 6,966,776 | B1 * | 11/2005 | Jones | 434/112 |
| 7,746,986 | B2 * | 6/2010 | Bucchieri et al. | 379/52 |
| 2002/0194005 | A1 * | 12/2002 | Lahr | 704/271 |
| 2006/0134585 | A1 * | 6/2006 | Adamo-Villani et al. | 434/112 |
| 2006/0234193 | A1 * | 10/2006 | Sahashi | 434/112 |
| 2006/0286513 | A1 * | 12/2006 | McLellan | 434/112 |
| 2007/0111171 | A1 * | 5/2007 | Kane | 434/156 |

OTHER PUBLICATIONS

Office Action from Canadian Patent Application No. 2,565,693.

* cited by examiner

*Primary Examiner* — Kesha Y. Frisby
(74) *Attorney, Agent, or Firm* — Anglehart et al.

(57) ABSTRACT

A method of representing information to a person comprising displaying an image viewable by a person, the image comprising visual markers representative of portions of a human body minimally necessary to communicate with the person, the visual markers, when viewed by the person, causing the person to extrapolate the human body, a remainder of the image being visually silent with respect to the person. The method is particularly applicable to represent information so as to be perceivable by a hearing-impaired person (e.g. deaf person) wherein a plurality of images, when displayed, one after another on a display device, represent information perceivable by the hearing-impaired person via sign language.

20 Claims, 29 Drawing Sheets
(29 of 29 Drawing Sheet(s) Filed in Color)

FIG. 4 - PRIOR ART

METHOD OF REPRESENTING INFORMATION

CROSS-REFERENCE TO RELATED APPLICATIONS

The present application claims the benefit of priority to U.S. Provisional Application Ser. Nos. 60/862,913 (filed Oct. 25, 2006) and 60/855,046 (filed Oct. 26, 2006), and to Canadian Patent Application No. 2,565,693 (filed Oct. 25, 2006), all entitled "Method of Representing Information". All of these applications are incorporated herein by reference.

FIELD OF THE INVENTION

The present invention relates to methods for representing information, and in particular methods for representing information which are preferably adapted to be perceivable by deaf persons.

BACKGROUND OF THE INVENTION

There are millions of deaf persons throughout the world. Because they are deaf, one of the most common means that deaf persons use to communicate is sign language. Sign language uses manual communication instead of sound to convey meaning—simultaneously combining hand shapes, orientation and movement of the hands, arms or body, and facial expressions to express fluidly a speaker's thoughts. In this way, the communication can be received visually as opposed to aurally, which is obviously not possible.

Something of which most non-deaf people are not aware is that most deaf persons read or write with great difficulty. Most people who have been deaf since birth have always been exposed to sign language in order to communicate. Sign language has quite a different syntax structure and uses spatial and temporal references in a completely different way than spoken languages. (The difference between sign language and spoken languages is conceptual and is far greater than between even disparate spoken languages such as English and Chinese.) The use of sign language by deaf persons moulds their cognitive abilities into a series of automated processes that their normal intellectual functioning comes to rely on. Reading a written language is something that these automated processes are simply not adapted to do at all. This means that for most deaf persons written languages are an alien form of communication that is mostly incomprehensible, even in basic situations. Indeed, only very highly motivated deaf persons, through years of study and with the long-term help of interpreters, are able to master the skill of reading, and go on to higher education.

Nonetheless, in order to ensure their integration into society, information must be made available to deaf persons in a manner in which they are capable of receiving it. Given that most of these persons do not have adequate reading skills, the information must therefore be available to them in sign language. Conventionally, in order to do this, the services of a sign language interpreter must be engaged, and he or she must interpret either the written or spoken language (as the case may be) for the deaf person(s). The interpretation may obviously proceed in many different ways depending on the situation. It may happen live, it may be simultaneously broadcast, or the interpreter's image may be captured on film or digitally and may be later broadcast and/or reproduced on media that can be physically sent to the deaf person. FIGS. 1a, 1b, 2a, and 2b show examples of sign language interpretation by an interpreter. In FIG. 1a the interpreter 100 is in the process of making the sign "maple tree" (in Quebec Sign Language—the sign language used in French-speaking Canada). FIG. 1b is a side view of FIG. 1a. In FIG. 2a the interpreter 100 is in the process of making the sign "unknown". FIG. 2b is a side view of FIG. 2a. Note that in the signs in all of these figures, both the facial expression and the hands are used in the making of the signs.

More recently, with increasing advancements in computer science, a new technology has developed: the 3D avatar. Now common in computerized videogames, a 3D avatar is a 3-dimensional graphical image that represents a person in a computerized environment. Much work has been done on computerizing sign language so that as close to lifelike as possible 3D-avatars maybe used to communicate with deaf persons via sign language by viewing the avatars on a screen. FIG. 3 shows an example of a male 3D-avatar 102 in the process of signing. One of the main goals of the development of this technology is to allow automated machine-translation of either spoken or written language to occur, and it is believed that one day this will be an extremely useful and beneficial technology allowing better communication for deaf persons.

FIG. 4 shows an example of a female 3D-avatar 104 being used in the process of simultaneous translation for a news cast.

Nonetheless, neither conventional sign-language interpretation, nor the current efforts to machine-automate sign-language interpretation using avatars, is (or will be) optimal. This because of one main reason that has generally been heretofore overlooked by those working in sign-language interpretation. Written language as a string of characters has the ability to be visually anonymous with respect to its author and to be extraneous-content neutral. That is to say that where a document is written in a standard regular font (e.g. the Times New Roman font of the present patent application), the reader of the document is not exposed to the physical characteristics of the author of the document (e.g. in the case of the present patent application a reader reading this sentence will quickly realize that he or she knows nothing about clothing or appearance of the patent attorney who wrote it, nor anything of the inventors of the invention described herein). The reader cannot therefore make conscious or unconscious judgments about the content of the document in view of anything that he or she could have known if the present written text using characters that were not visually anonymous and extraneous-content neutral (e.g. in the case of the present patent application the patent attorney was wearing a blue T-shirt when he wrote it. A reader whose favorite color is red might therefore have unconsciously looked less favorably towards the present invention had the present written text conveyed that fact somehow (obviously without it being written down as such)), Its ability to anonymize its author is one of the reasons that written text is so well suited to mass communication.

In addition, written text has the ability to be generally distraction-free for its reader. I.e. as long as text is printed in a black standard regular font in a standard size on clean white paper, there will be nothing (on the paper) to distract the reader from the words themselves and to impair the ability of the reader to comprehend the information conveyed by the words.

Conventional sign-language interpretation and the current uses of computerized 3D avatars in sign-language interpretation do not have these benefits. They are not visually anonymous. Even if the actual speaker or author of the words is not viewable by the deaf person, the interpreter always is. The interpreter, being a physical person (or lifelike representation of one), has an important number of personal characteristics (e.g. sex, age, hair color, eye color, skin tone, etc.) that will subtly (or not so subtly) affect the deaf person who is viewing them based on his or her personal preferences, biases or situation. For example, a hearing person desirous of getting a divorce will not have the same reaction to reading a pamphlet on divorce, as would a deaf person having the same pamphlet interpreted to them by an interpreter of the same sex of the person that the deaf person desires to divorce.

Moreover, neither conventional sign-language interpretation nor the current uses of computerized 3D-avatars in sign-language interpretation are distraction-free for the deaf person. As is commonly known, persons losing the ability to use one of their senses generally have augmented abilities of (at least some) of their other senses to compensate. Most deaf people therefore have increased visual acuity and a very acute perception of visual activity. This, combined with the fact that deaf people communicate visually, means that their minds are constantly taking in an exceptional amount of visual information and are attempting to process it to determine its meaning. But there is no meaning in most of it, as our society generally communicates aurally. A large portion of the visual information is therefore simply meaningless. All of this extraneous information is the visual equivalent to loud background noise. Yet it cannot be ignored by deaf people; it must be tolerated if communication is desired. This is a constant distraction to them. It is both tiring and annoying. A rough analogy for a hearing person would be to talk to a person in car on a mobile telephone while the car is being driven at high speeds, with the window open. There would be an enormous amount of background noise that the hearing person would have to take in, determine to be useless, and then ignore, while at the same time taking in the voice of the person speaking, processing the words and understanding their meaning, assuming they can be heard at all. This task of sensory abstraction would not be a simple or easy task, and over time it would become annoying and exhausting. Indeed, most people in such a situation would simply hang up and try calling again later. Unfortunately, deaf persons do not have the visual equivalent of that option. Up until now, they have simply had to learn to deal with this situation. No one has focused on improvements in this area.

In view of these drawbacks, there is a need in the art for an improved method for representing information so as to be perceivable by a deaf person, and particularly one that attempts to ameliorate at least some of the situations described above.

STATEMENT OF THE INVENTION

It is therefore an object of the present invention to provide a method for representing information that is an improvement over conventional methods.

In one aspect, as embodied and broadly described herein, the present invention provides a method for representing information so as to be perceivable by a hearing-impaired person (i.e. deaf persons and other persons with hearing impairments who generally communicate with sign language) comprising causing to be displayed on a display device viewable by the person a plurality of images. The images comprise visual markers representative of portions of a human body minimally necessary to communicate with the person via sign language. The visual markers, when viewed by the person, cause the person to extrapolate a human body (i.e. not necessarily a whole human body, but at least the relevant portions thereof). The visual markers are selected from the group including (i) visual eye markers causing the person to extrapolate human eyes and their state and relative orientation with respect to the extrapolated human body, (ii) visual mouth markers causing the person to extrapolate a human mouth and its state and relative orientation with respect to the extrapolated human body, (iii) visual hand markers causing the person to extrapolate human hands and their state and their orientation and position with respect to each other and the extrapolated human body, and (iv) visual forearm markers causing the person to extrapolate human forearms and their relative orientation and position with respect to the extrapolated human body. A remainder of the image is visually silent with respect to the person. The images, when displayed, one after another on the display device, represent information perceivable by the person via sign language.

The present invention is predicated on the fact that sign language generally uses only hand shape and orientation; movement of the hands, arms or body; and facial expressions to convey meaning. The inventors have realized that the human brain does not need to actually see a person (or person-like avatar) in order to perceive those features necessary to understand the sign being communicated. The brain need only be provided with a certain minimum amount of visual information representative of the necessary human body parts to make the sign being communicated, and the brain will extrapolate the rest. ("Extrapolate" should be understood in the context of the present application as meaning to project, extend or expand (known data or experience) into an area not known or experienced so as to arrive at conjectural knowledge of the unknown area by inferences based on an assumed continuity, correspondence or other parallelism between it and what is known.) That is to say, for example, that in order for a person being communicated to in sign language to perceive a facial expression of the signer, the present inventors have realized that the receiver need not actually see the face of the signer. The receiver need only see a certain minimum number (and in some cases type) of visual facial markers and the brain of the receiver will extrapolate the facial expression of the signer (despite not actually having seen a face). In fact, if the facial expression of the signer is the sole feature necessary to communicate the desired sign to the receiver, the receiver need see nothing other than the necessary visual facial markers. The receiver need not see the rest of the human body, nor even extrapolate the rest of the human body through visual markers, at all.

In the context of the present invention, visual markers should be understood to encompass anything perceivable by the eye of a viewer that conveys to the viewer the minimum amount of visual information necessary (whether alone or in combination with other visual markers) to allow the viewer to extrapolate (to the extent necessary in a given context) at least the portion of the human body that the visual marker serves to mark.

For example, in the context of sign language, where it is desired to allow the receiver to extrapolate human eyes, visual eye markers would be used; preferably two of them, a left visual eye marker and a right visual eye marker. In such a case, each of these visual eye markers would preferably include a series of discrete marks (preferably between 3 and 8) placed along a upper-eye-shaped curve and a series of discrete marks (preferably between 2 and 6) placed along a lower-eye-shaped curve associated with the upper-eye-shaped curve, the upper- and lower-eye-shaped curves being shaped appropriately to the one of a right eye and a left eye that is being represented. Discrete marks are preferred in this instance because they allow for better extrapolation of the facial expression (with respect to the eyes at least), given that the distance between the discrete marks can change (for example) between various facial expressions. (By contrast, the change in the length of a line may not be perceivable or far more difficult to perceive.) The visual eye marker(s) would obviously be situated with respect to each other (if both are present) and other visual markers (if present) congruously so as to allow the receiver to correctly extrapolate the appropriate portion of the human body, e.g. a human face. A single visual eye marker may also be used if that is all that is necessary.

Similarly, where it is desired to allow the receiver to extrapolate a human mouth, a visual mouth marker would be used. In such a case, the visual mouth marker would preferably include a series of discrete marks (preferably between 3 and 10) placed along an upper-mouth-shaped curve and a series of discrete marks placed (again preferably between 3 and 10) along a lower-mouth-shaped curve associated with the upper-mouth-shaped curve. (Discrete marks are preferred for the visual mouth marker for the same reason as with the visual eye markers.) A visual tongue marker, a single mark of an appropriate shape, for example, may also be present if needed. The visual mouth marker would obviously be situated with respect to other visual markers (if present) congruously so as to allow the receiver to correctly extrapolate the appropriate portion of the human body, e.g. a human face.

Where it is desired to allow the receiver to extrapolate human hands, visual hand markers would be used; preferably two of them, a left visual hand marker and a right visual hand marker. In such a case, each of these visual hand markers would preferably include surfaces shaped in the form of a human hand appropriate to the one of a right hand and a left hand that is being represented. The visual hand markers are preferably wrist-less (i.e. the surfaces to not extend below the hand to include a wrist) as in most instances the wrist is unnecessary extraneous information. A single visual hand marker may also be used if that is all that is necessary.

To assist the viewer in extrapolating the position of the extrapolated human hands, visual forearm marker(s) may be used. In such cases, the viewer may be caused to extrapolate the relative orientation and position of the extrapolated forearms with respect to the extrapolated human body via a variance, at least between some images, in at least one of size, shape, brightness, color, and contrast, of the visual forearm markers, and preferably at least three of them. The visual forearm markers are preferably elbow-less (i.e. the markers do not extend to an elbow), as in most instances the elbow is unnecessary extraneous information. A single forearm marker may also be used if that is all that is necessary.

To further assist the viewer in extrapolating the position of the extrapolated human hands, a visual indicator may be provided when one of the visual hand markers contacts the extrapolated human body. The visual indicator may be anything perceivable by the eye of the viewer. For instance, the local portion of the extrapolated human body may glow or a small spark may be shown at the point of contact.

An image of the present invention will comprise a visual marker or combination of visual markers representative of those portions of a human body minimally necessary to communicate the desired information. Because of this, the remainder of the image need not (and indeed highly preferably should not) have any extraneous visual information. The remainder of the image can therefore be said to be visually silent with respect to the person. In this context, visual silence should be understood to include both absolute visual silence (i.e. when there is no extraneous visual information) and effective visual silence (i.e. when the amount of extraneous visual information is so low as to effectively be filtered out by the brain of the viewer). For ease of understanding, a comparison to the hearing world can be made. Absolute silence is when there is no sound. Effective silence is when the amount of sound is so low as to be filtered out by the brain of the listener. Such is the case in cities for example, where there is an amount of background noise that is effectively filtered out by the brain of a listener such that the listener will not actually hear it under normal circumstances unless he or she actually concentrates on it. Indeed, this background noise is so ever present that the same person will actually notice its absence when he or she is in a rural setting.

The visual silence of the remainder of the Image may be achieved by having the extrapolated human body being identical in color to a background color of the image. I.e. the entire image will be a single color with the exception of the visual markers. Preferably this color will be black, as black (in many cultures) represents absence or nothingness. There may be, however, other instances where the use of another background color is preferred or is required, depending on the context.

The visual markers, in order to be seen, will be visually distinguishable, almost always by being a different color from the background. Where the background is black, it is preferred that the visual markers be blue-green in color and more preferably a color being (or being akin to) that resulting from fluorescence under exposure to ultra-violet to violet light (i.e. having a wavelength of between 200 nm and 420 nm.). These colors appear to be very easily distinguishable on a black background for most people.

Where the information being represented is sign language, in most cases the signs are not statically represented, they are dynamically represented. That is to say that movement of the body or parts thereof (e.g. a change in facial expression or movement of the hands) is required in order to represent most signs. Images, however, are by definition static, and are therefore at best a picture of a slice in time of a moving sign of sign language. In order to represent the entire sign, a plurality, i.e. many, images will be needed that show the sign preferably from its beginning to its end. Viewing these images one after another (usually in rapid succession and preferably so quickly that the brain will perceive the group of images as displaying fluid motion) will represent the sign to the viewer. In such cases it may be that the visual markers necessary in one of the images (because those visual markers are necessary at, for instance, the beginning of a sign) are not necessary in another of those images (because other markers, in addition to or in place of those visual markers, are only necessary at, for instance, the end of a sign). In such cases, while all of the visual markers necessary from the beginning to the end of a sign may be present in all of the images, it is preferred that the visual markers present in each image are only those that are actually necessary in that image, i.e. at that point in the relative time of the sign. The visual markers present in each image will thus generally vary between the images, so as to minimize the total amount of visual information being presented to a viewer.

It is preferred that the images be stored on a machine-readable medium (e.g. a videocassette, a DVD, computer memory, a hard drive, a flash drive etc.) as machine-executable instructions appropriate for a machine which reads the medium (e.g. a videocassette player, a DVD player, a CPU, etc.) so that the images may be played back, broadcast or the like as a video on a display device associated with the machine (e.g. a television, computer monitor, film projector, etc.), or transmitted across a computer network or the internet from a server to a computer. It would of course, be possible, however, for the display device to be one or several sheets of paper (including a book) and for the images to be displayed thereon (e.g. via printing, film development, drawing, etc.).

Of course, in cases where the information being represented is static, as for example in one of the few static sign language signs, only a single image may be used. The image may be displayed on any appropriate display device, including, for instance, being painted on wall or other object.

Images of the present invention may be created by any suitable means, for instance, via a computer-generated graphics software. One possibility would be to create a black background and an avatar being the same black color as the background with the exception of any visual markers placed thereon. Movement could be accomplished by any of the aforementioned conventional software means to allow an avatar to execute sign language gesturing. Another possibility would be to use a motion capture technique similar to that used in the motion picture industry. Yet another possibility is to have a human interpreter dressed completely in black with the exception of certain areas which would glow under ultraviolet light and form the visual markers, and to film that person in a black room under ultra-violet light while he or she is signing. In such a case, the visual markers comprised of discrete marks could be applied (to the face for instance) with a template or stencil to ensure continuity between interpreters and/or between different instances of interpretation. (An example of this method is described in further detail below.)

One significance of the present invention is that, because it relies on sensory abstraction of observable signing behavior it now provides the ability to anonymize sign language with respect to its author and interpreter, and to be extraneous-content neutral, in a way similar to written language. Referring to the above example, because the visual markers can be constructed in such a manner as to convey a facial expression without actually showing or depicting a face, the receiver of the sign has no information about the face of the interpreter of the sign. Because the receiver would not see a face or body, the receiver would not know (for example) the sex, age, eye color, hair color, and skin color of the interpreter (or the similar simulated features of an avatar). The interpreter can thus use anonymous signs and no bias will be had on the part of the receiver. Similarly, because the receiver would not see a face or body, the receiver's brain would not seek to interpret a lot of information that is not relevant to the sign (this information being all information over the minimum necessary visual markers). None of that extraneous information need be present at all. The visual equivalent to loud background noise can thus be silenced by using the present invention.

The present invention has another significance. It provides the ability for the simultaneous creation of multiple parts of an interpretative video using human interpreters. In the past, given the desire for consistency in interpretation, only a single interpreter could be used to create an interpretative video. These videos were generally made linearly in time, with a single interpreter from start to finish doing the whole document. The present invention, with its anonymized interpreters, allows for a text to be broken up in to multiple sections and for each section to be interpreted and filmed simultaneously. Because no distinguishing characteristics of any of the various interpreters used will be present, the various parts can then be put together into a whole video without any indication that different interpreters were used. Continuity may be preserved while production time may be decreased.

In another aspect, as embodied and broadly described herein, the present invention provides a method of representing information to a person comprising displaying an image viewable by a person, the image comprising visual markers representative of portions of a human body minimally necessary to communicate with the person, the visual markers, when viewed by the person, causing the person to extrapolate a human body, a remainder of the image being visually silent with respect to the person.

It should be understand that, although impetus for the creation of the present invention was the desire to improve the representation of information via sign language, the invention is not so limited. Indeed, with the realization that the human mind will extrapolate portions of a human body (or the whole body) when provided with the appropriate visual markers on a visually silent background, comes the ability to represent information visually through images (other than via words) in an anonymized, non-distracting fashion, whenever desired.

Additional and/or alternative features, aspects, and advantages of the embodiments of the present invention will become apparent from the following description, the accompanying drawings, and the appended claims.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

For a better understanding of the present invention, as well as other aspects and further features thereof, reference is made to the following description which is to be used in conjunction with the accompanying drawings, where:

FIG. 1a shows a front view of a prior art sign language interpreter in the process of making the sign "maple tree";

FIG. 1b shows a right side view of the sign language interpreter of FIG. 1a;

FIG. 2a shows a front view of the prior art sign language interpreter in the process of making the sign "unknown";

FIG. 2b shows a right side view of the sign language interpreter of FIG. 2a;

DETAILED DESCRIPTION OF PREFERRED EMBODIMENTS

Figure 1:
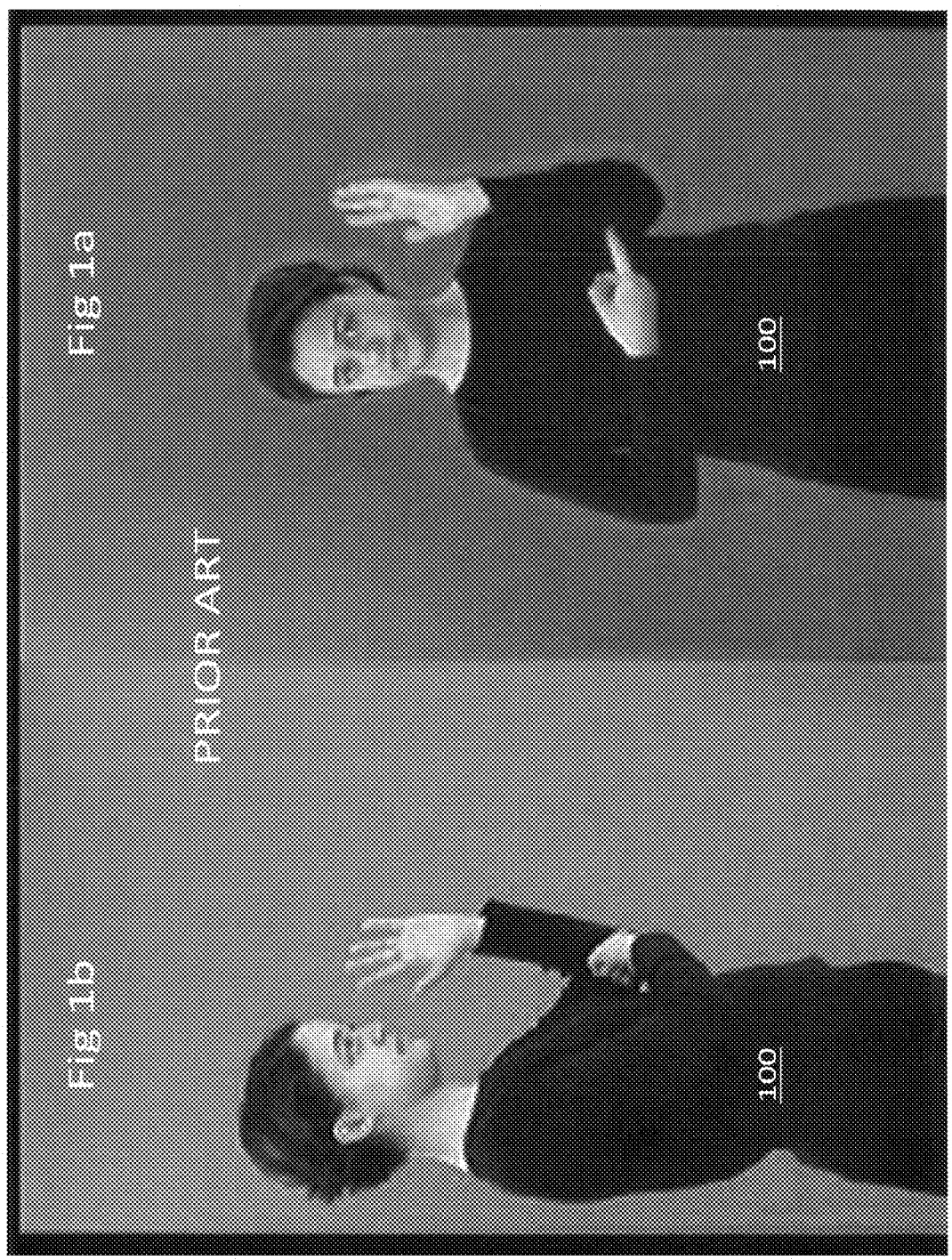
Figure 2:
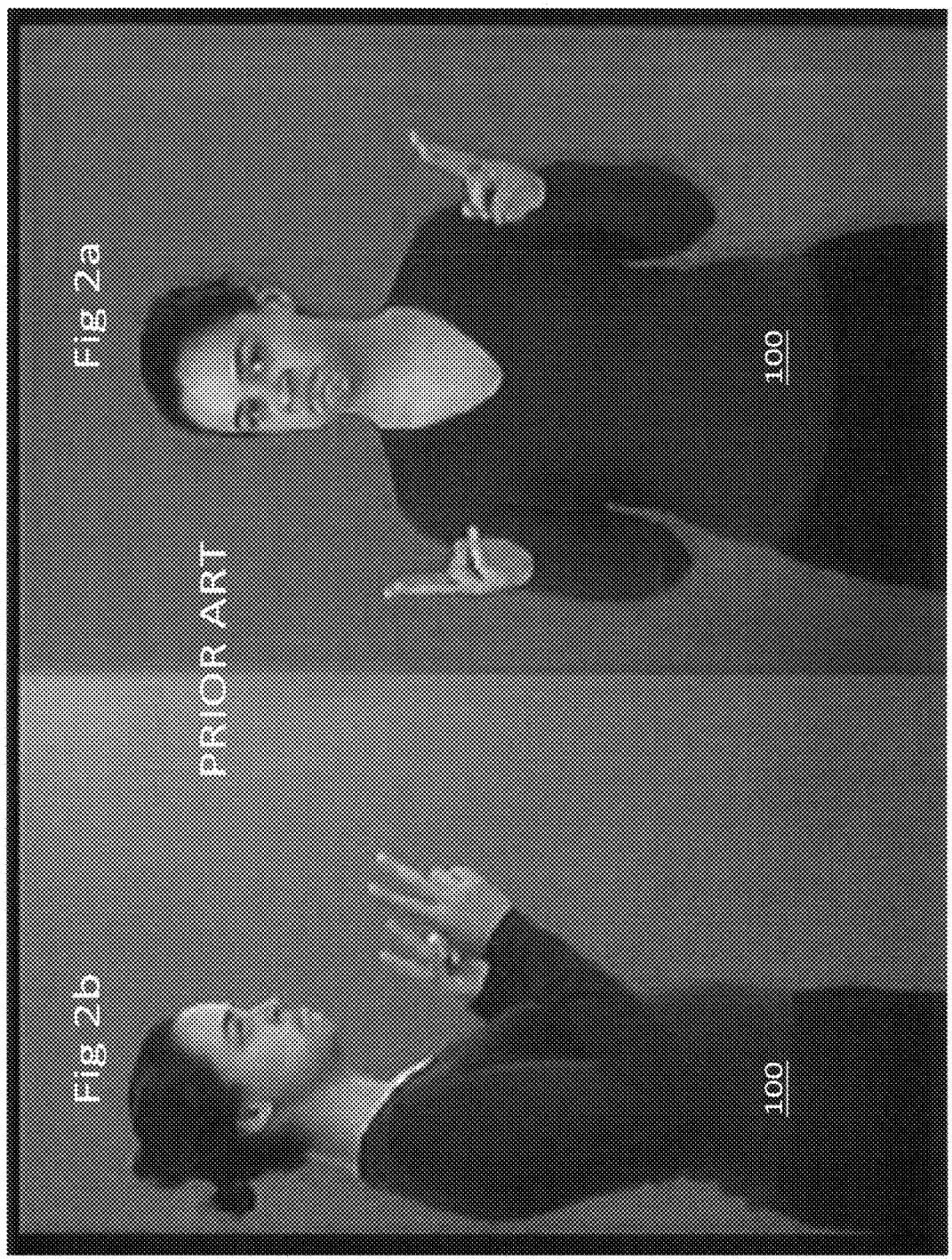
Figure 3:
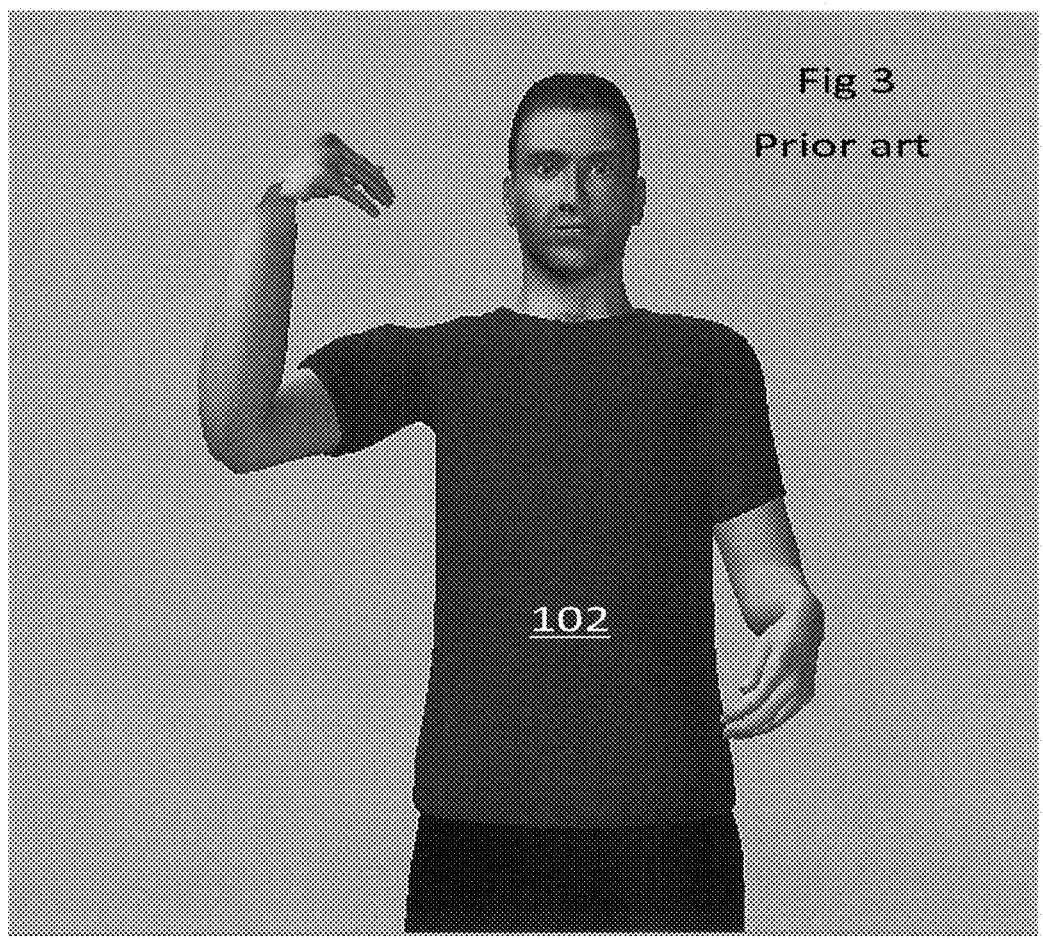
FIG. 3 shows a male 3D-avatar in the process of signing.
Figure 4:
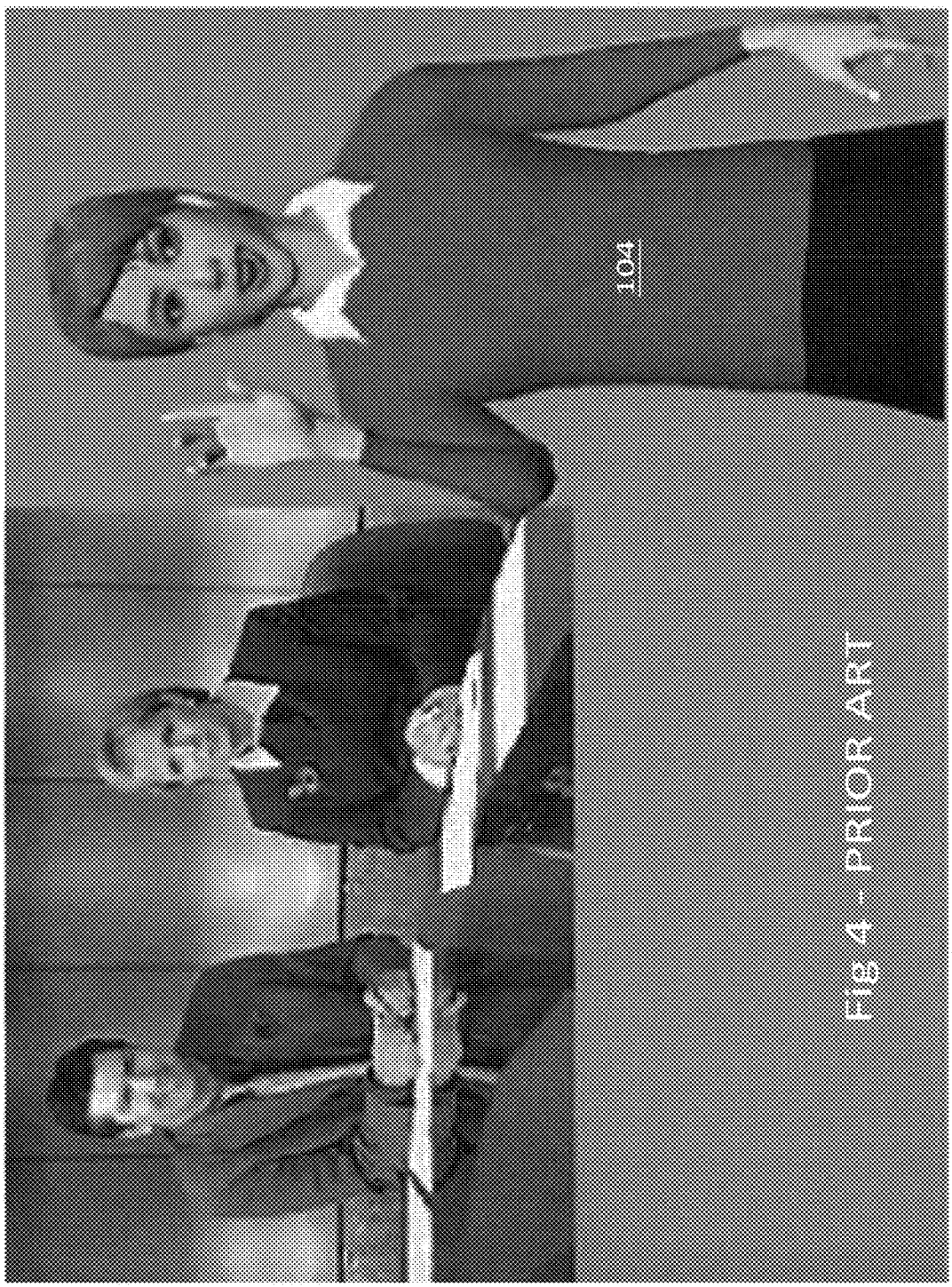
FIG. 4 shows a female 3D-avatar in the process of signing as part of the simultaneous translation of a news cast.
Figure 5:
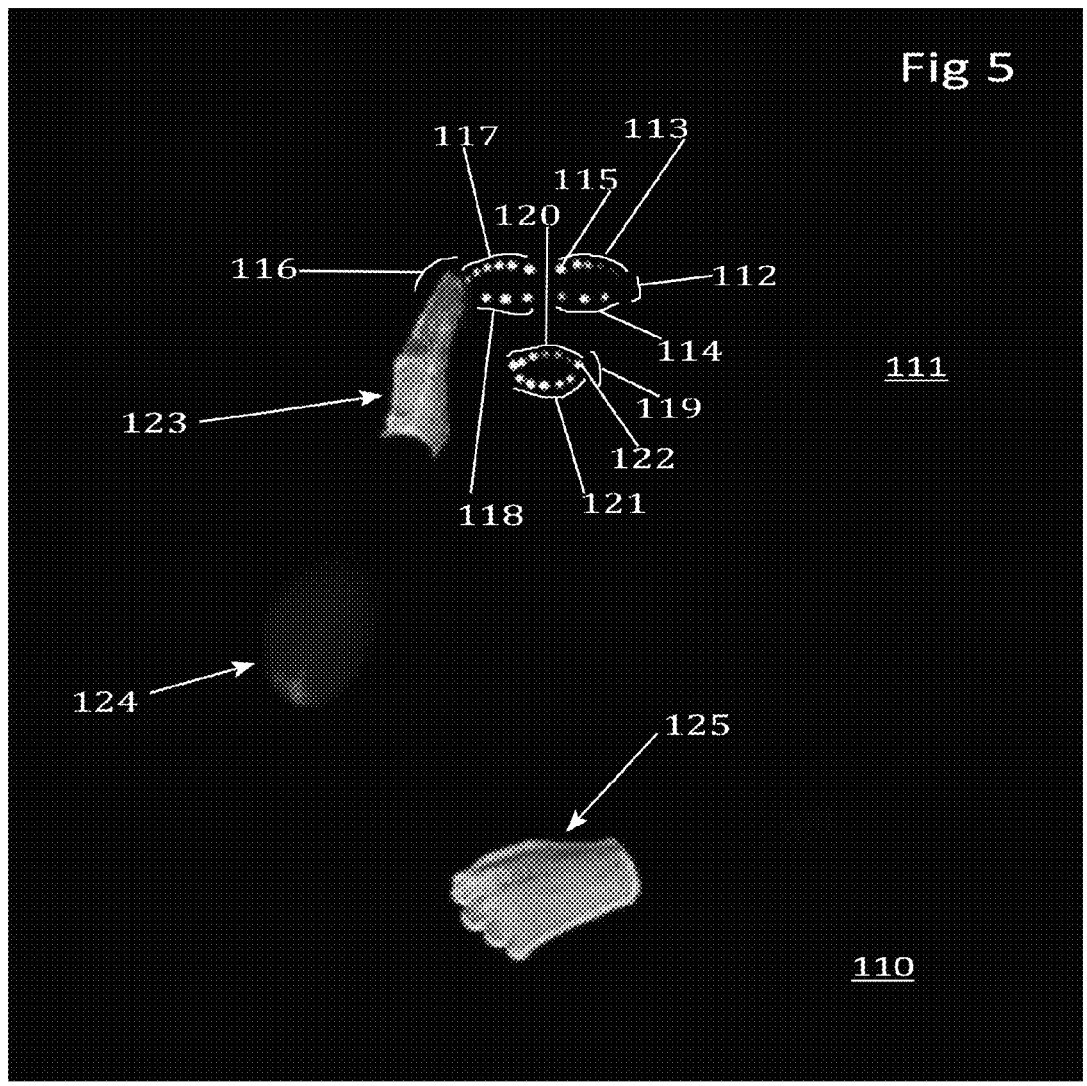
FIG. 5 shows an image of the present invention using visual markers to represent a slice in time of the sign "hello"
Figure 6:
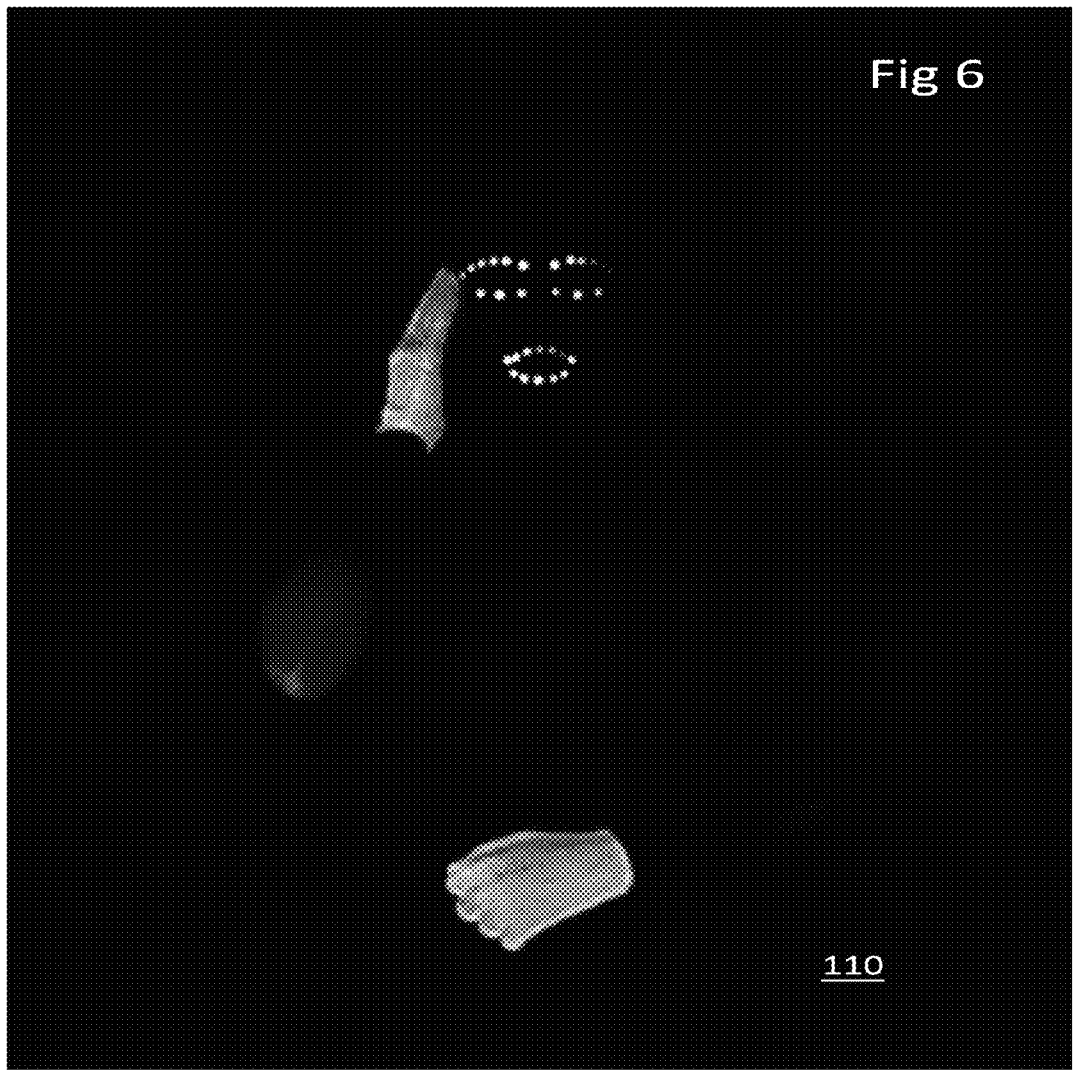
FIG. 6 shows the image of FIG. 5 with the reference numbers removed.

FIG. 5 (and identical FIG. 6 without reference signs for ease of viewing) is an image 110 in accordance with the teaching of the present invention. The image 110 has a black background 111. The image has a plurality of visual markers: a visual left eye marker 112, a visual right eye marker 116, a visual mouth marker 119, a visual right hand marker 123, a visual right forearm marker 124, and a visual left hand marker 125.

The visual left eye marker 112 is made up of a series of 6 discrete marks placed along an upper-left-eye-shaped curve 113 and a series of 3 discrete marks placed along a lower-left-eye-shaped curve 114. (An individual discrete mark is identified as reference number 115.) Similarly, the visual right eye marker 116 is made up of a series of 6 discrete marks placed along a upper-right-eye-shaped curve 117 and a series of 3 discrete marks placed along a lower-right-eye-shaped curve 118. The visual mouth marker 119 is made up of a series of 7 discrete marks placed along an upper-mouth-shaped curve 120 and a series of 5 discrete marks placed along a lower-mouth-shaped curve 121. When viewed together, the visual left eye marker 112, the visual right eye marker 116, and the visual mouth marker 119, will cause a person viewing the image 110 to extrapolate the facial expression of an extrapolated person. (Obviously the image does not show an extrapolate person since the extrapolation only happens in the brain of the viewer of the image.)

The visual left hand marker 125 is a surface shaped in the form a human left hand. The visual right hand marker 123 is a surface shaped in the form of a human right hand. A visual right forearm marker 124 is an irregularly shaped surface. When viewed together the visual right hand marker 123, the visual right forearm marker 124, and the left hand marker 125 will cause a person viewing the image 110 to extrapolate the hands and arms and relevant parts of the upper body of the extrapolated human.

The image 110 represents information in the form of a moment or slice in time of the sign "hello" in Quebec sign language of French-speaking Canada. However, by using only blue-green visual markers and having the rest of the image black (and thus visually silent to the viewer), the interpreter of the sign (be it a human or an avatar—in fact from the drawing it is not even clear which it is) has become visually anonymous, and all extraneous visual information has been removed. Nonetheless, the information, i.e. the meaning of the sign, comes across very easily and clearly to a person capable of understanding Quebec sign language. There is now thus a way to render sign language visually anonymous as is plain written text. (Quebec sign language is being used here merely as an example, as would be understand by anyone skilled in the art, the teachings of the present invention could be used with other sign languages or forms of visual communication.)

Figure 7:
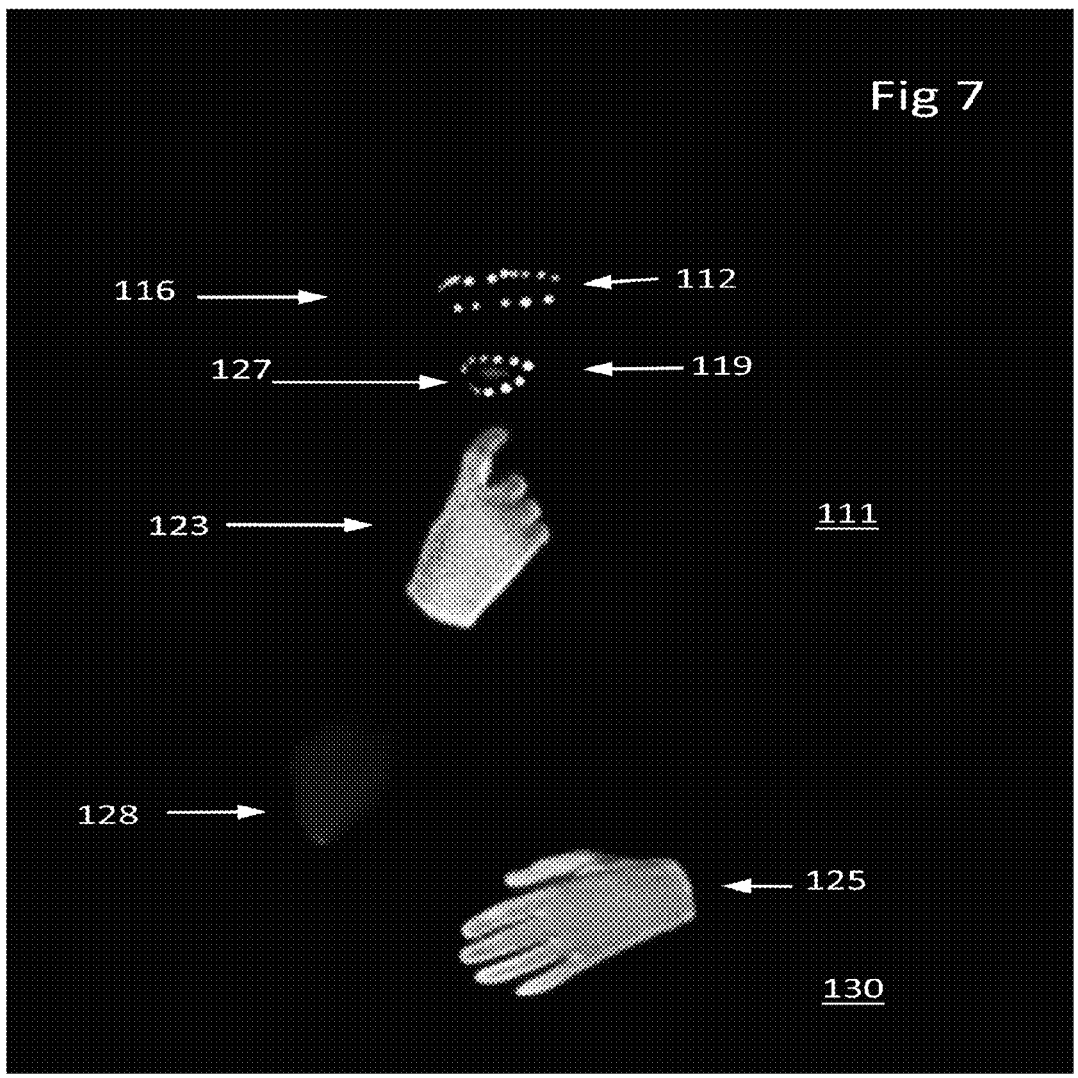
FIG. 7 shows an image of the present invention using visual markers to represent a slice in time of the sign "who"

FIG. 7 is another image 120 in accordance with the teaching of the present invention. The image 130 represents information in the form of a slice in time of the sign "who" in Quebec sign language. In image 120, a visual tongue marker 127 in the form of a single discrete mark is present.

Figure 8:
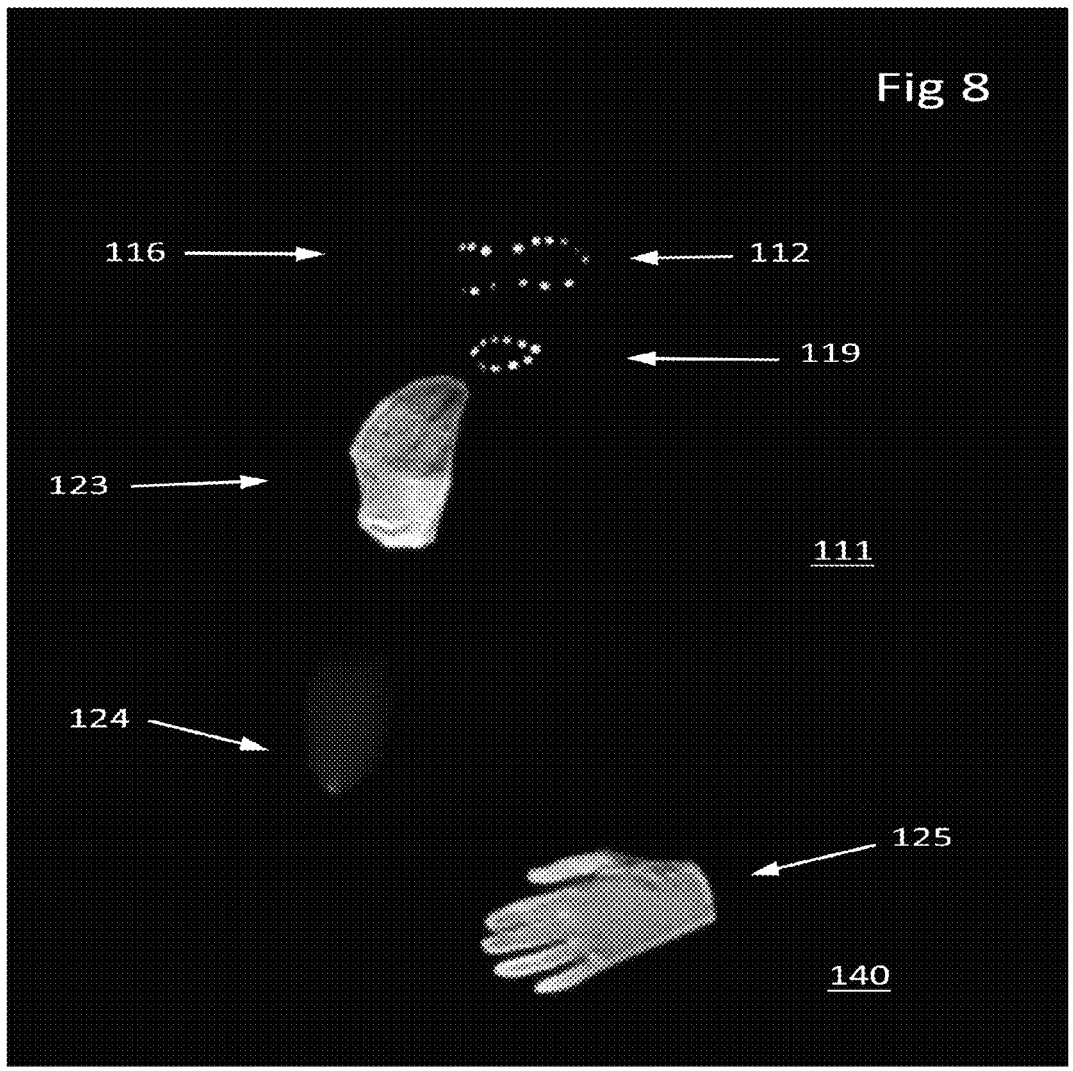
FIG. 8 shows an image of the present invention using visual markers to represent a slice in time of the sign "eat"

FIG. 8 is another image 135 in accordance with the teaching of the present invention. The image 135 represents information in the form of a slice in time of the sign "eat" in Quebec sign language.

Figure 9:
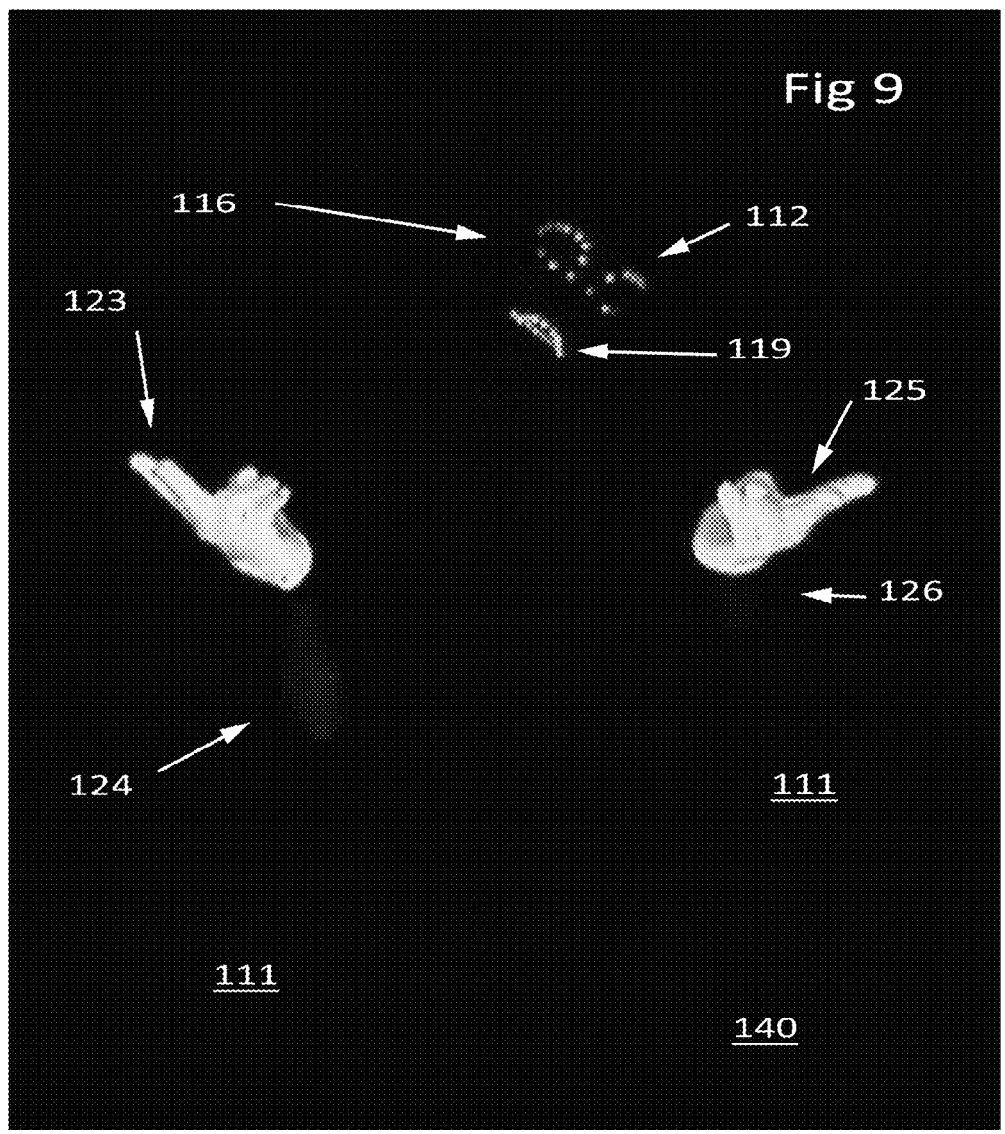
FIG. 9 shows an image of the present invention using visual markers to represent a slice in time of the sign "unknown"

FIG. 9 is another image 140 in accordance with the teaching of the present invention. The image 140 represents information in the form of a slice in time of the sign "unknown" in Quebec sign language. A visual right forearm marker 124 in the form of an irregularly shaped surface is present.

Figure 10:
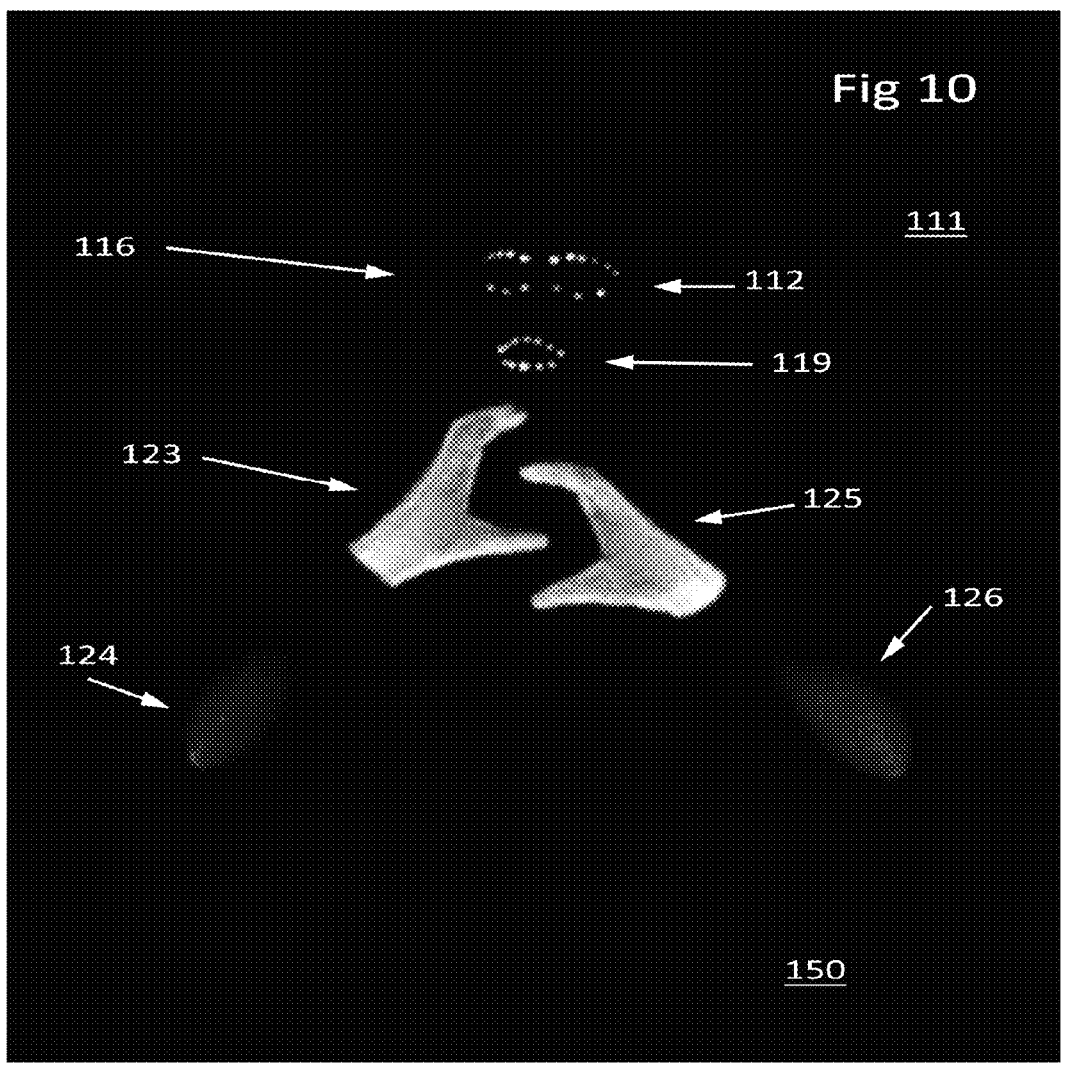
FIG. 10 shows an image of the present invention using visual markers to represent a slice in time of the sign "communication"

FIG. 10 is another image 150 in accordance with the teaching of the present invention. The image 150 represents information in the form of a slice in time of the sign "communication" in Quebec sign language.

Figure 11:
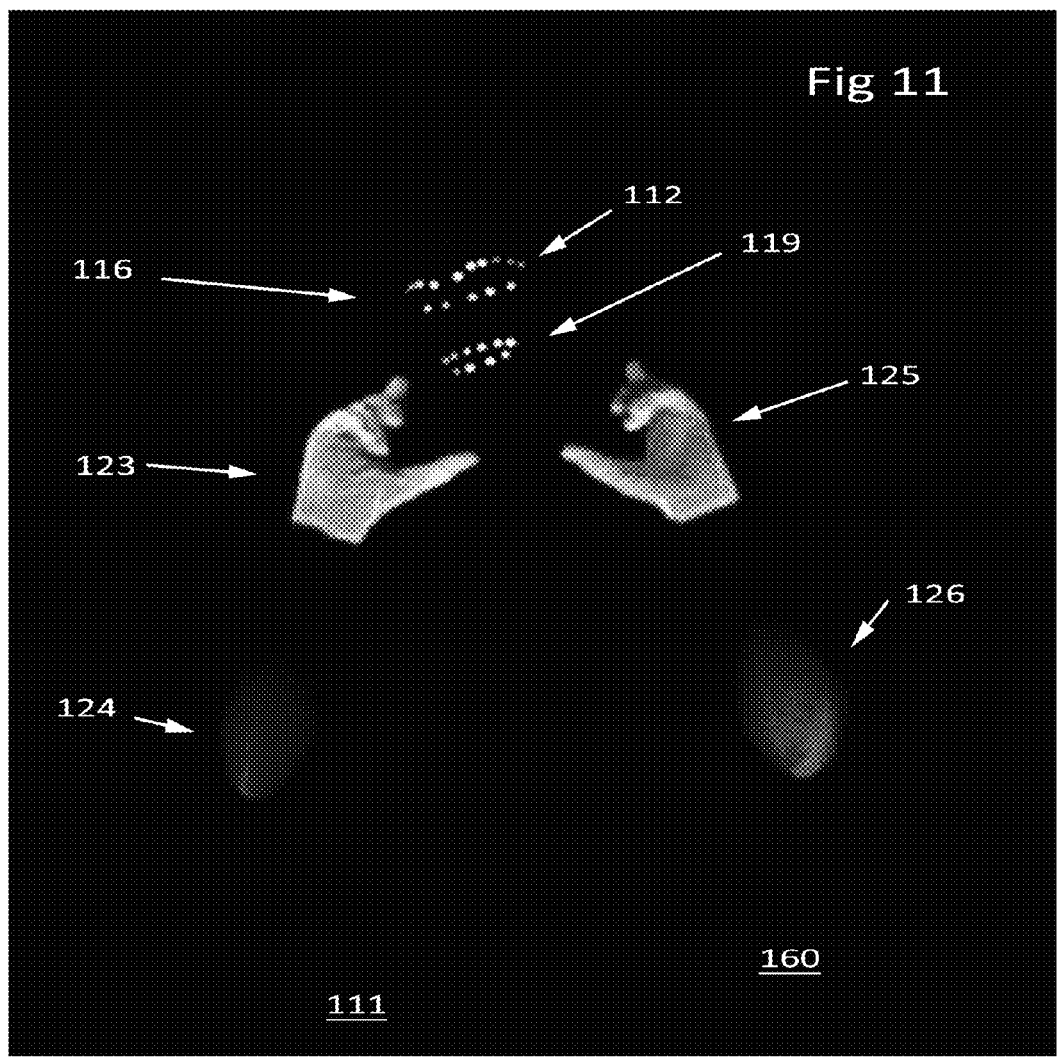
FIG. 11 shows an image of the present invention.

FIG. 11 is another image 160 in accordance with the teaching of the present invention.

Figure 12:
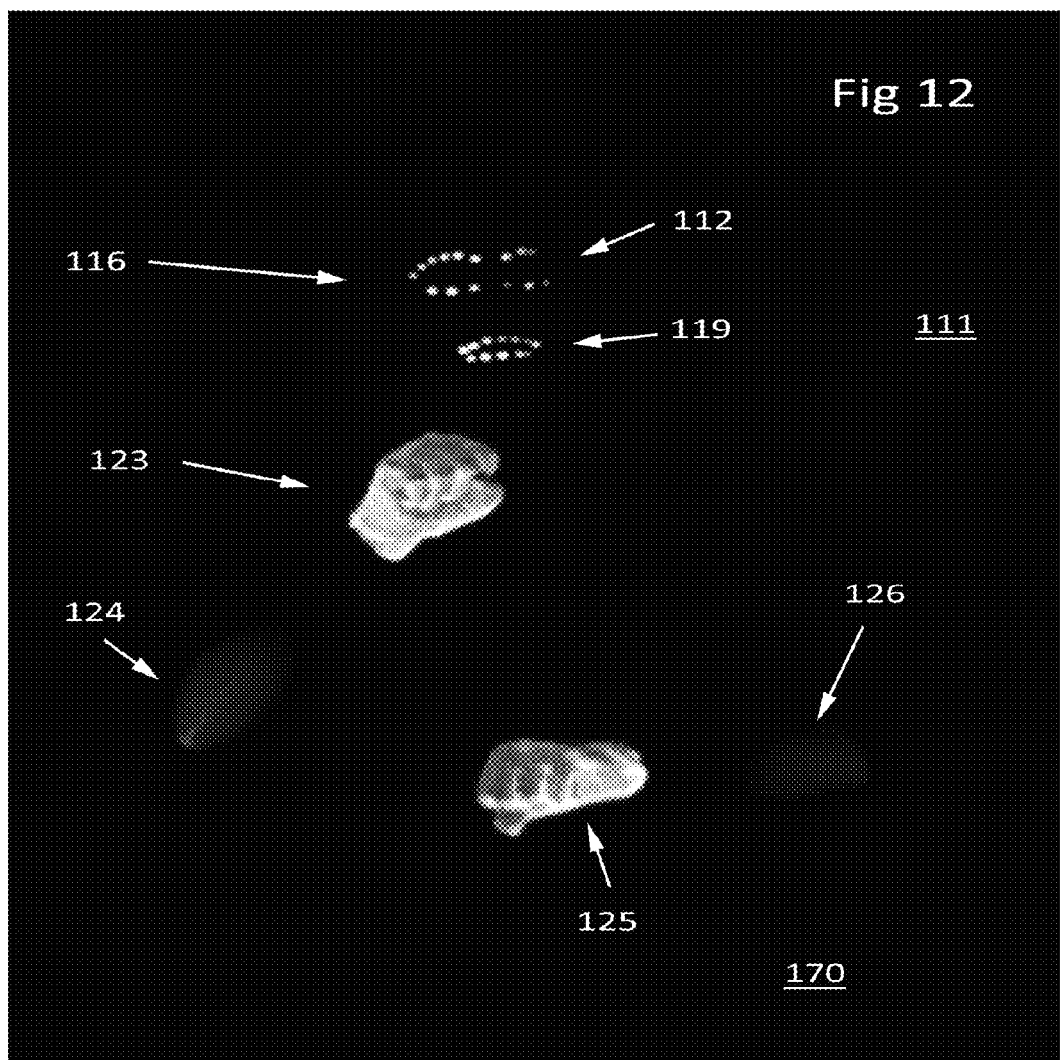
FIG. 12 shows an image of the present invention using visual markers to represent a slice in time of the sign "bicycle"

FIG. 12 is another image 170 in accordance with the teaching of the present invention. The image 180 represents information in the form of a slice in time of the sign "bicycle" in Quebec sign language.

Figure 13:
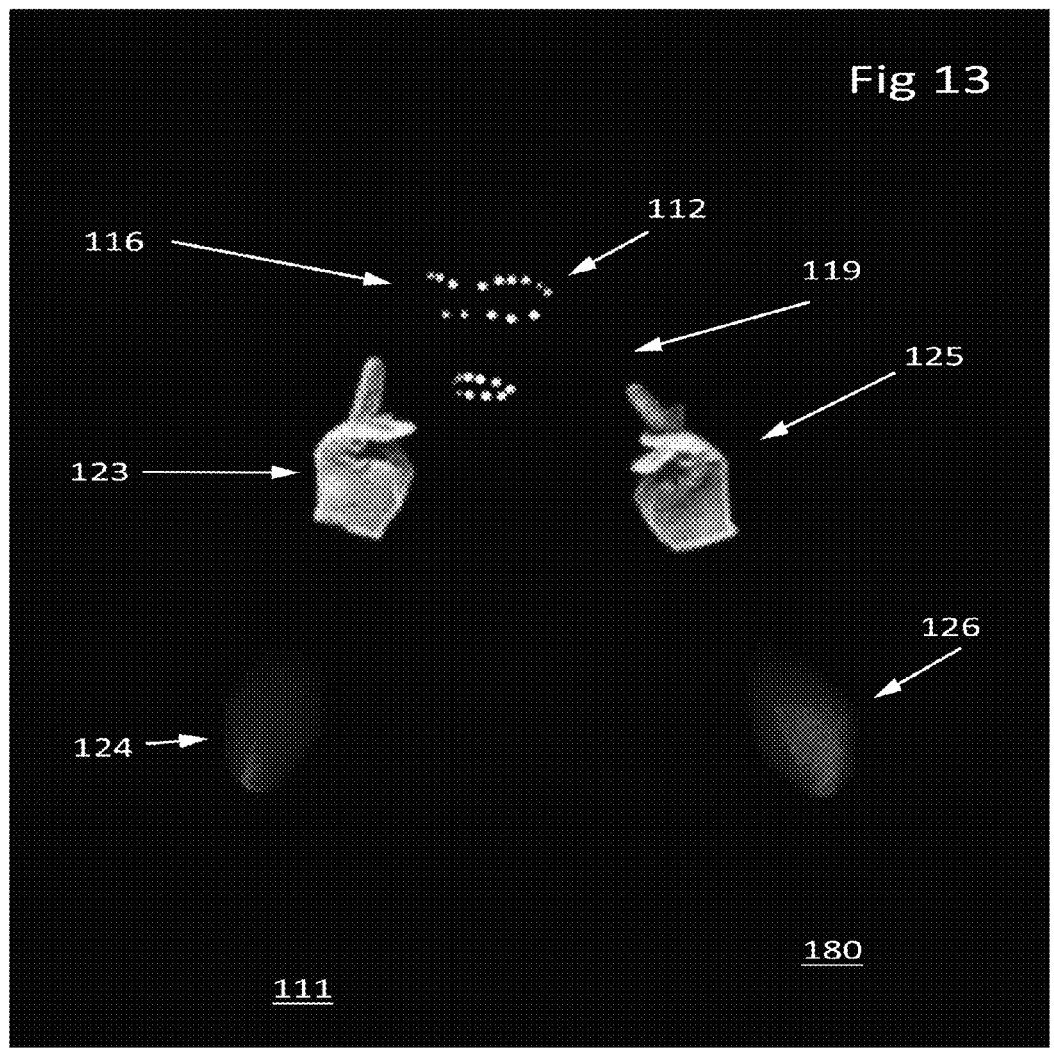
FIG. 13 shows an image of the present invention using visual markers to represent a slice in time of the sign "allow"

FIG. 13 is another image 180 in accordance with the teaching of the present invention. The image 180 represents information in the form of a slice in time of the sign "allow" in Quebec sign language.

Figure 14:
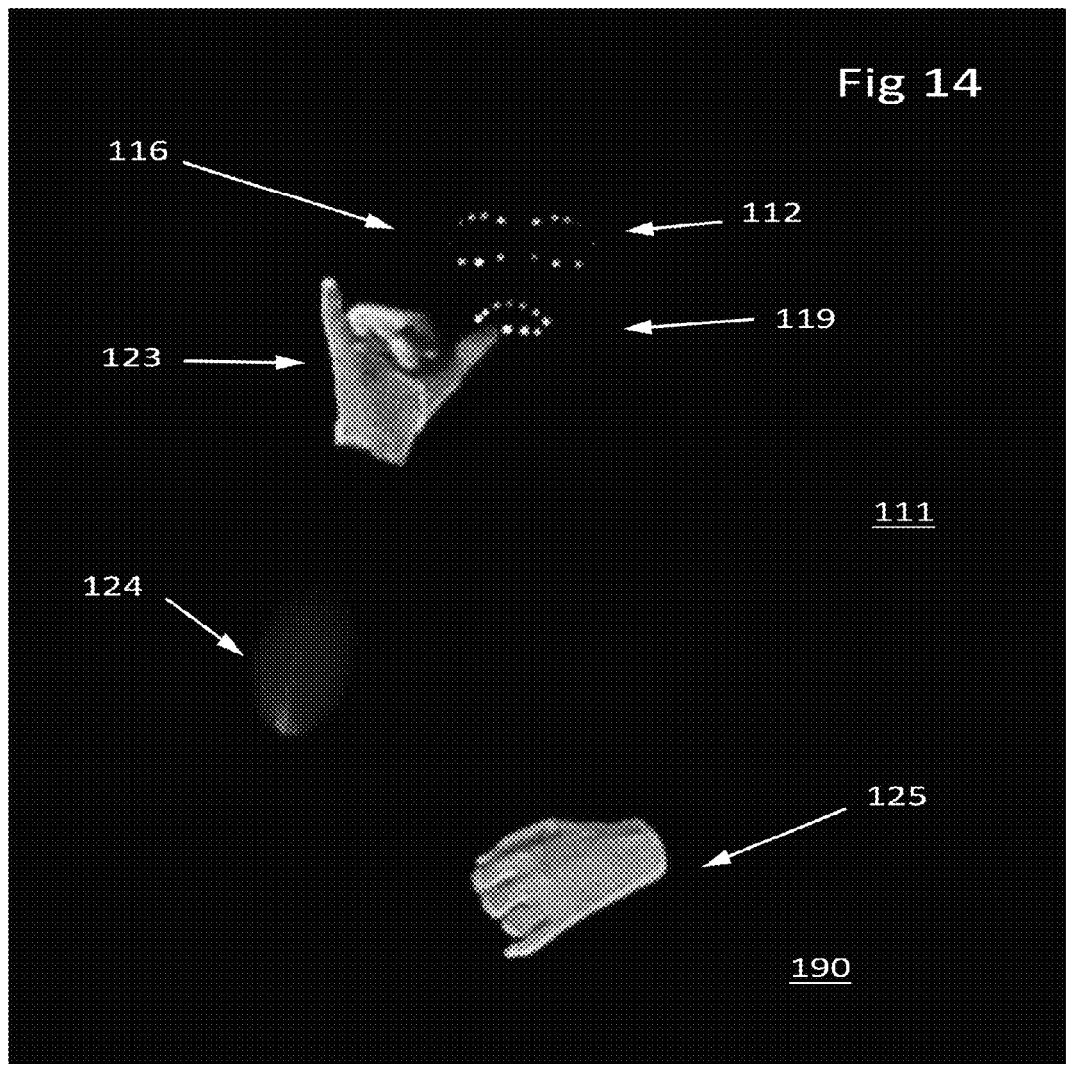
FIG. 14 shows an image of the present invention using visual markers to represent a slice in time of the sign "stay"

FIG. 14 is another image 190 in accordance with the teaching of the present invention. The image 190 represents information in the form of a slice in time of the sign "stay" in Quebec sign language.

Figure 15:
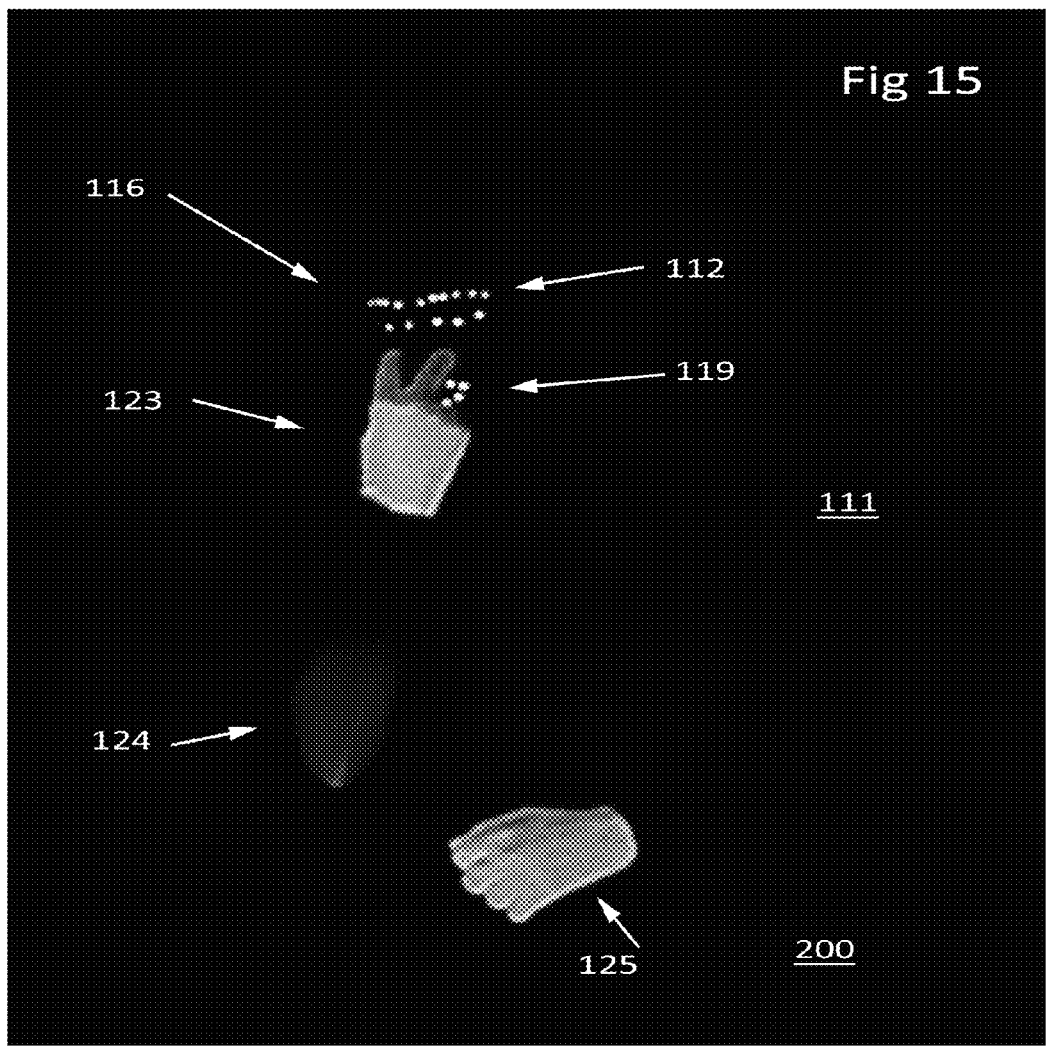
FIG. 15 shows an image of the present invention using visual markers to represent a slice in time of the sign "look at me"

FIG. 15 is another image 200 in accordance with the teaching of the present invention. The image 200 represents information in the form of a slice in time of the sign "look at me" in Quebec sign language.

Figure 16:
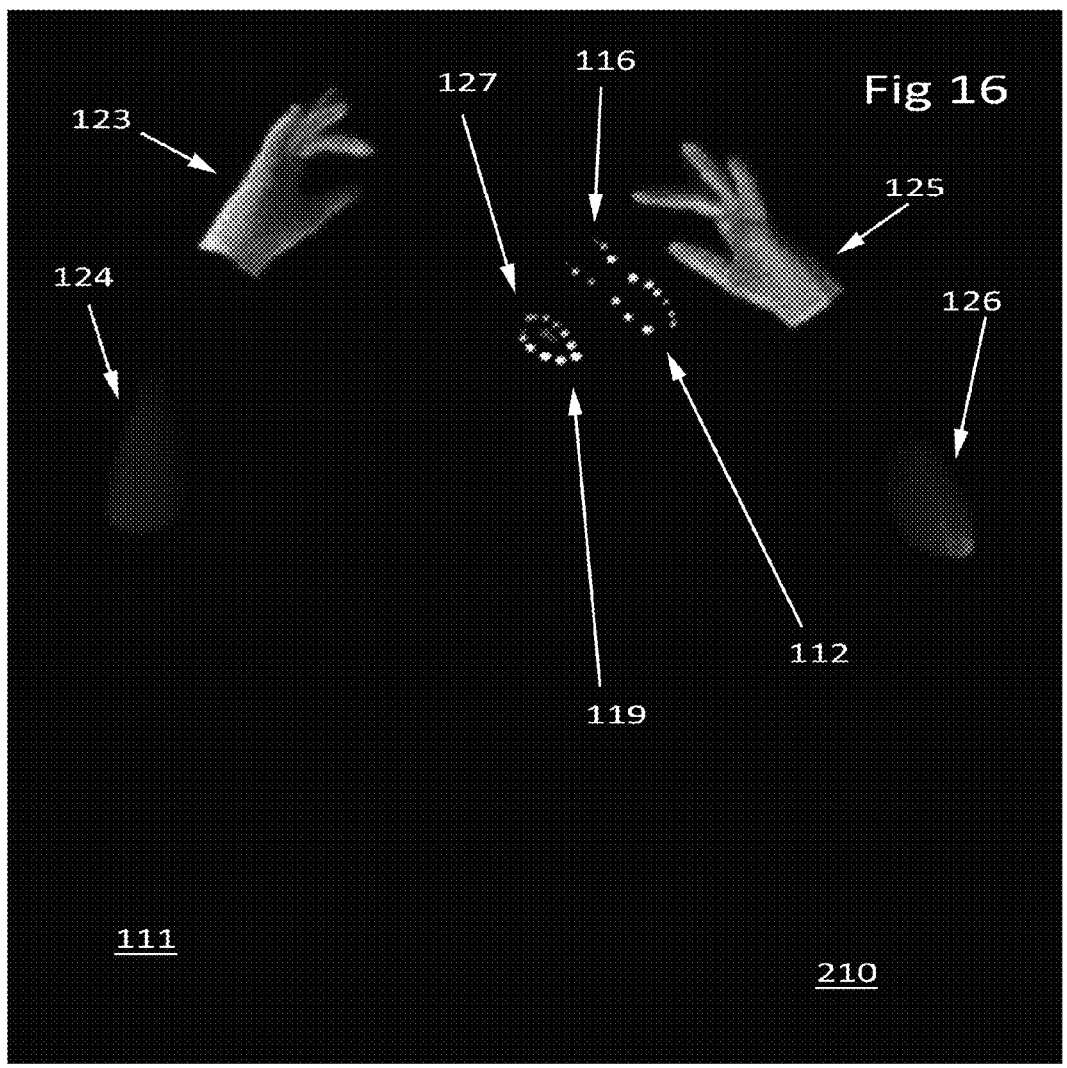
FIG. 16 shows an image of the present invention using visual markers to represent a slice in time of the sign "rain"

FIG. 16 is another image 210 in accordance with the teaching of the present invention. The image 210 represents information in the form of a slice in time of the sign "rain" in Quebec sign language.

Figure 17:
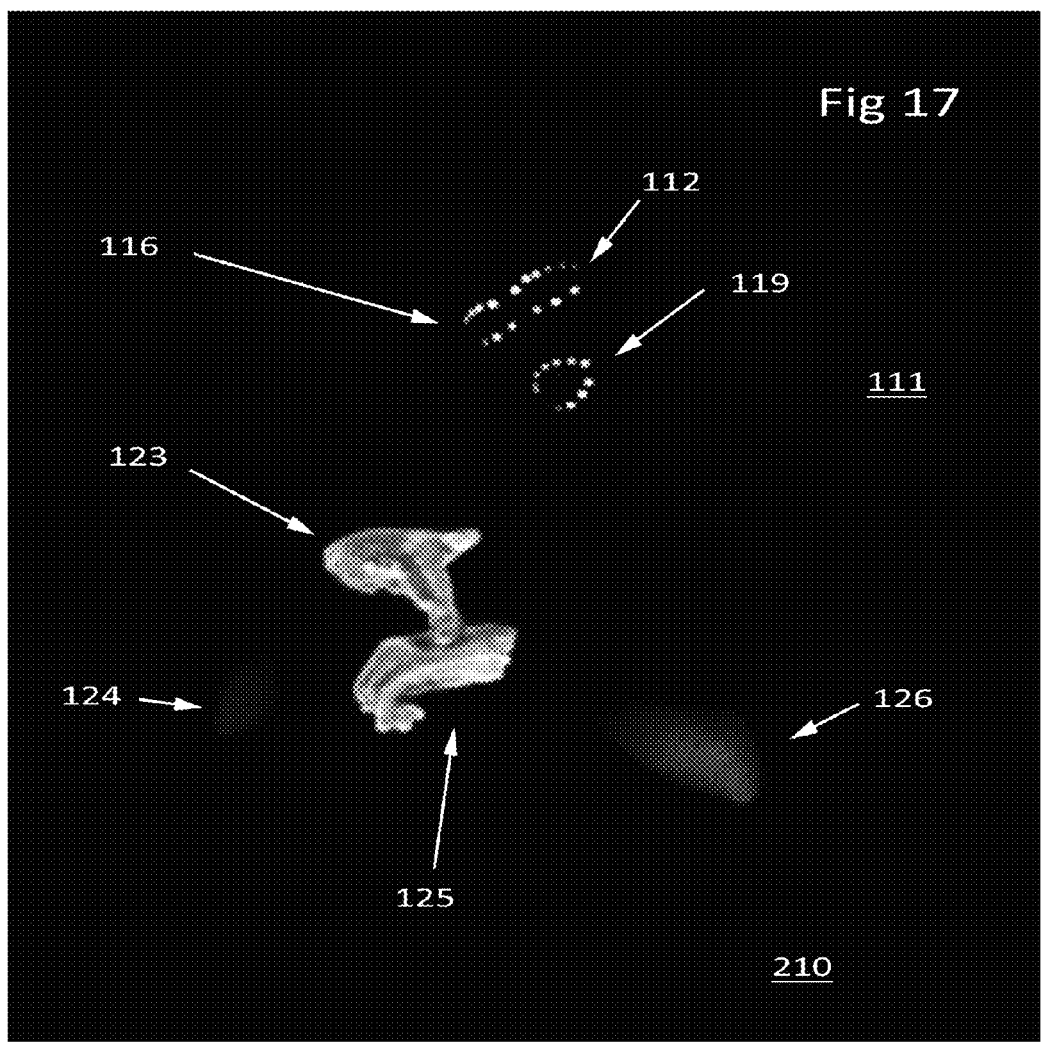
FIG. 17 shows an image of the present invention using visual markers to represent a slice in time of the sign "earth"

FIG. 17 is another image 215 in accordance with the teaching of the present invention. pinch image 215 represents information in the form of a slice in time of the sign "earth" in Quebec sign language 7.

Figure 18:
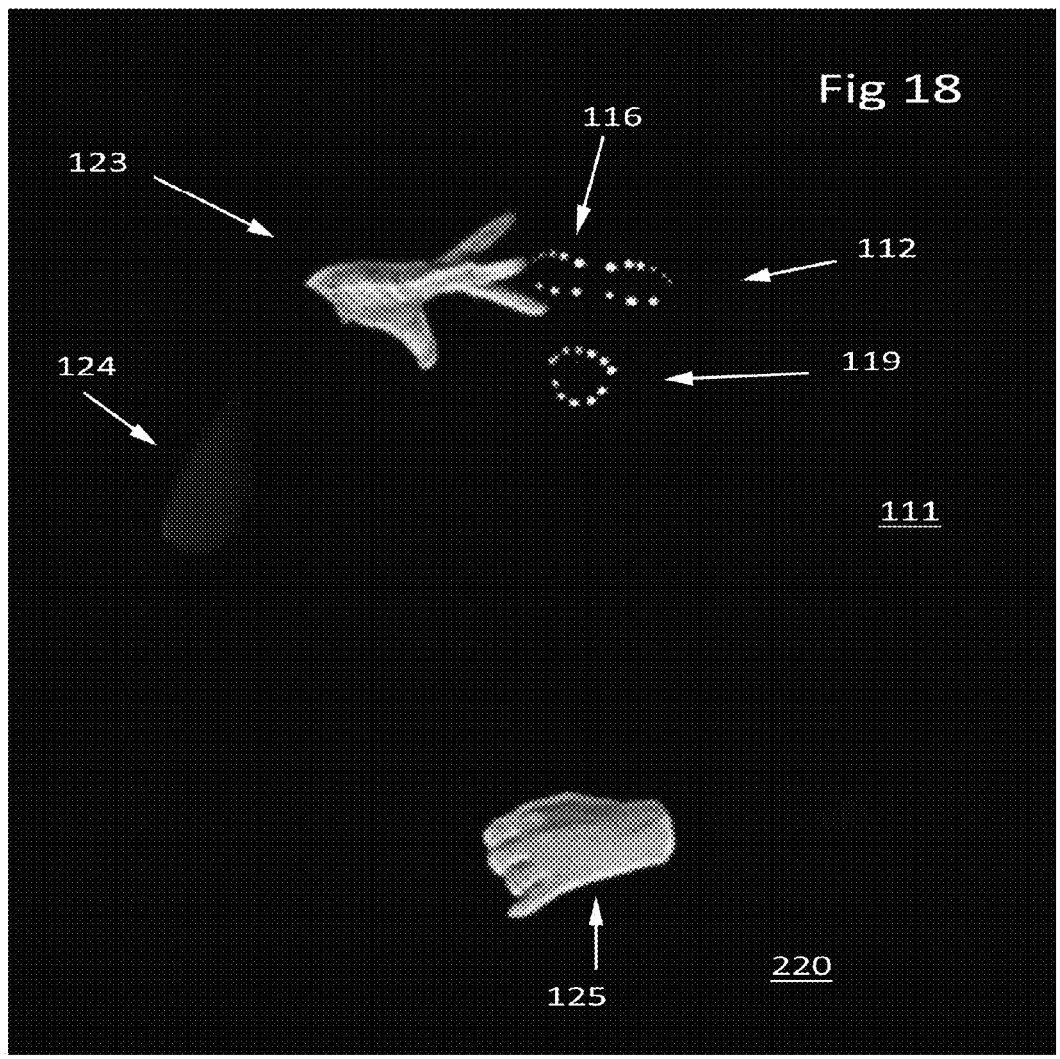
FIG. 18 shows an image of the present invention using visual markers to represent a slice in time of the sign "science"

FIG. 18 is another image 220 in accordance with the teaching of the present invention. The image 220 represents information in the form of a slice in time of the sign "science" in Quebec sign language.

Figure 19:
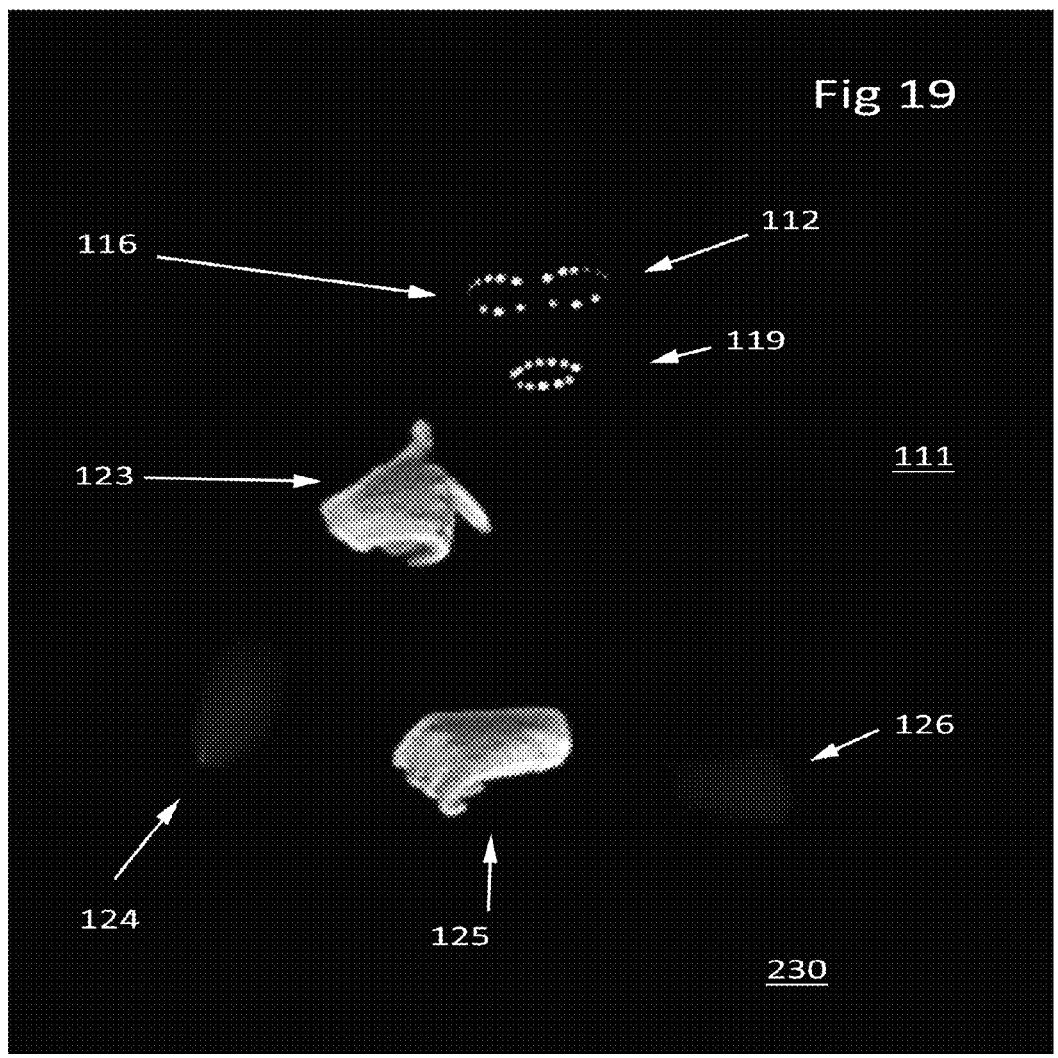
FIG. 19 shows an image of the present invention using visual markers to represent a slice in time of the sign "me"

FIG. 19 is another image 230 in accordance with the teaching of the present invention. The image 230 represents information in the form of a slice in time of the sign "me" in Quebec sign language.

Figure 20:
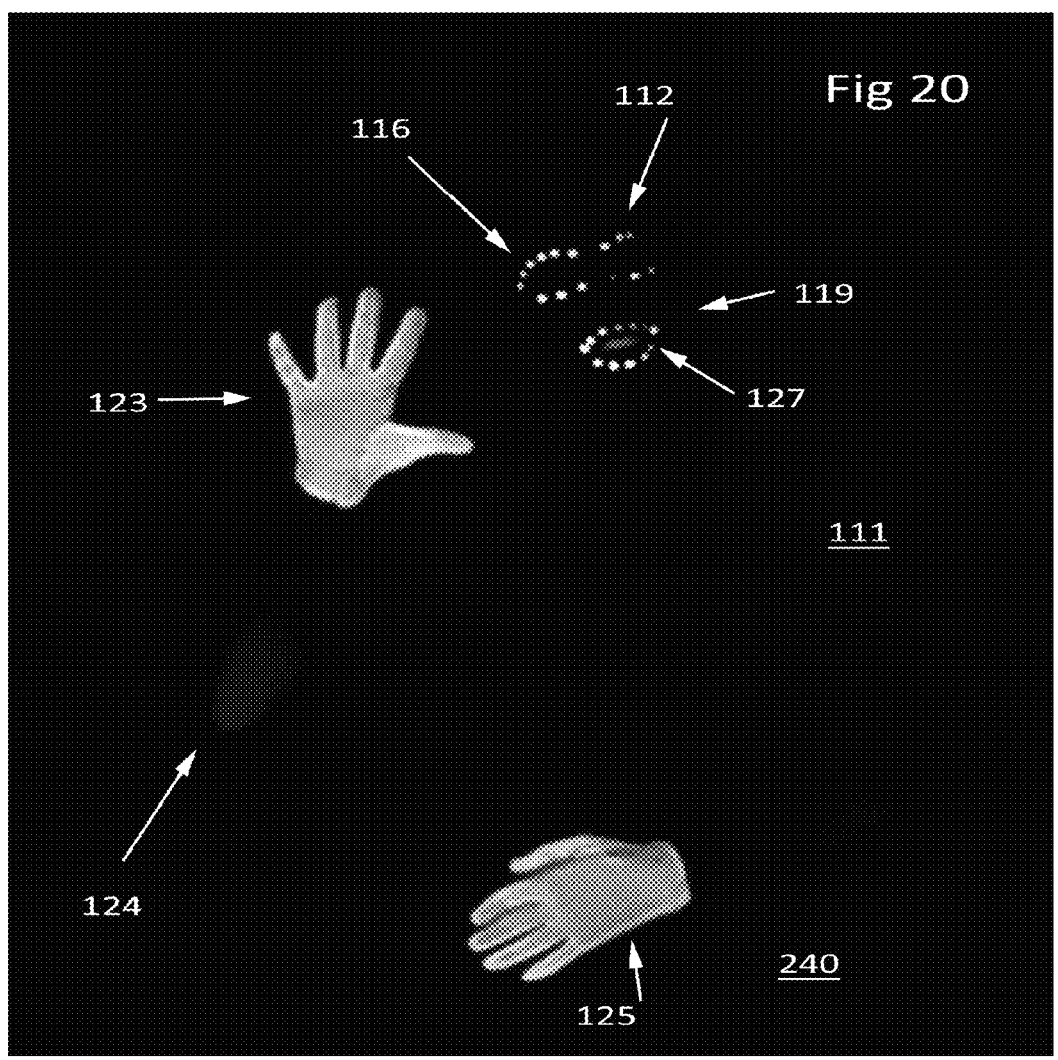
FIG. 20 shows an image of the present invention using visual markers to represent a slice in time of the last part of the sign "the number 35"

FIG. 20 is another image 240 in accordance with the teaching of the present invention. The image 240 represents information in the form of a slice in time of the second part of the sign "the number 35" in Quebec sign language.

Figure 21:
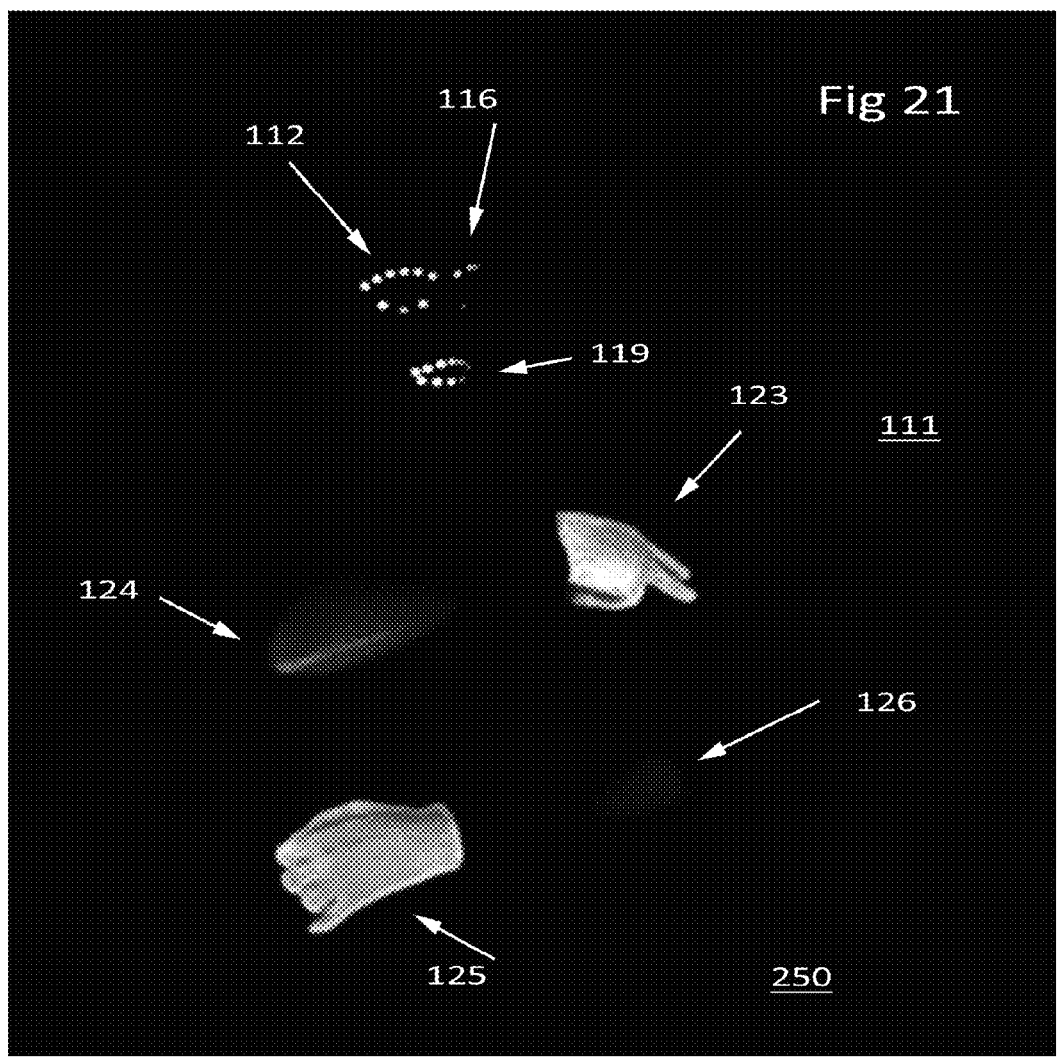
FIG. 21 shows an image of the present invention using visual markers to represent a slice in time of the sign "hospital"

FIG. 21 is another image 250 in accordance with the teaching of the present invention. The image 250 represents information in the form of a slice in time of the sign "hospital" in Quebec sign language.

Figure 22:
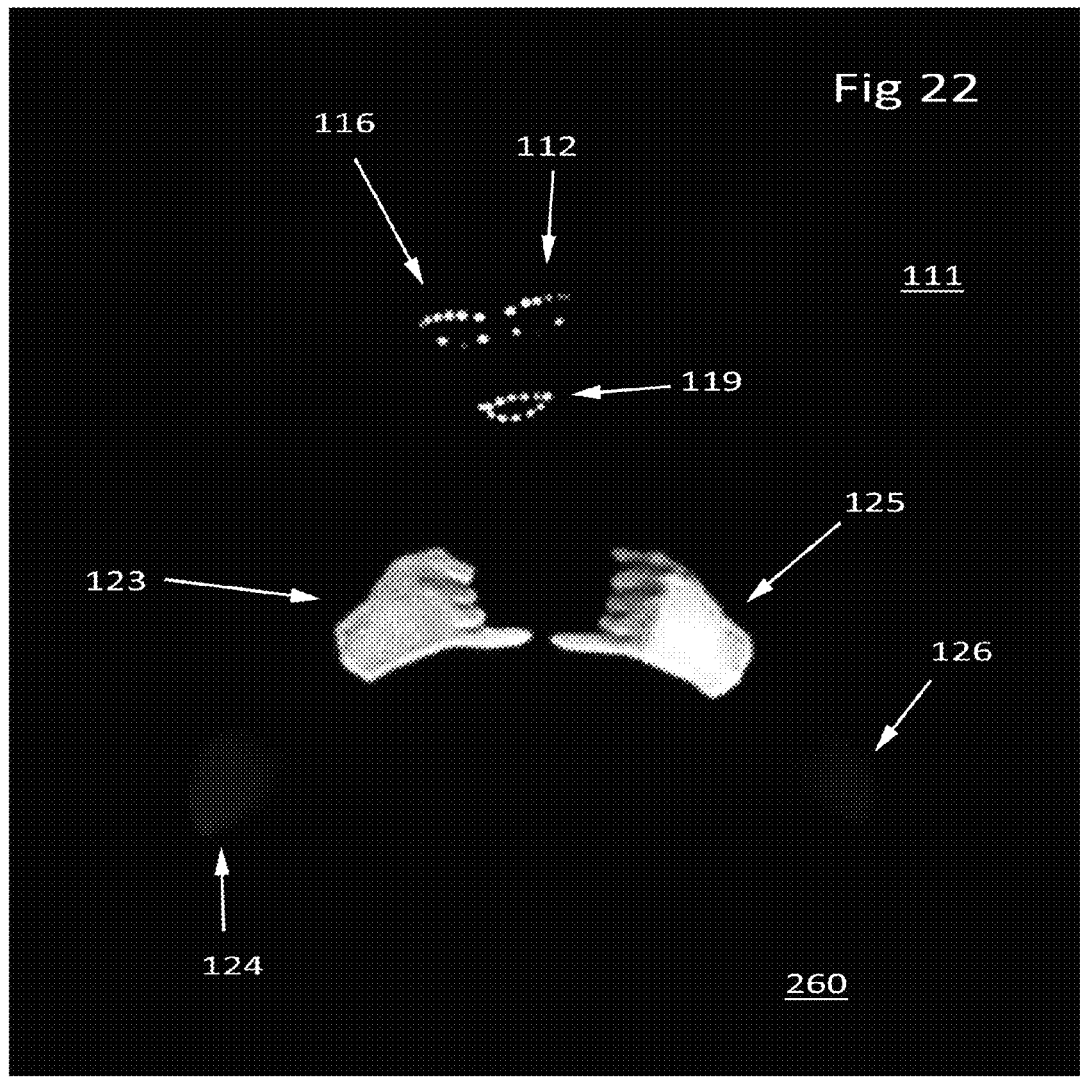
FIG. 22 shows an image of the present invention using visual markers to represent a slice in time of the sign "wire"

FIG. 22 is another image 260 in accordance with the teaching of the present invention. The image 260 represents information in the form of a slice in time of the sign "wire" in Quebec sign language.

Figure 23:
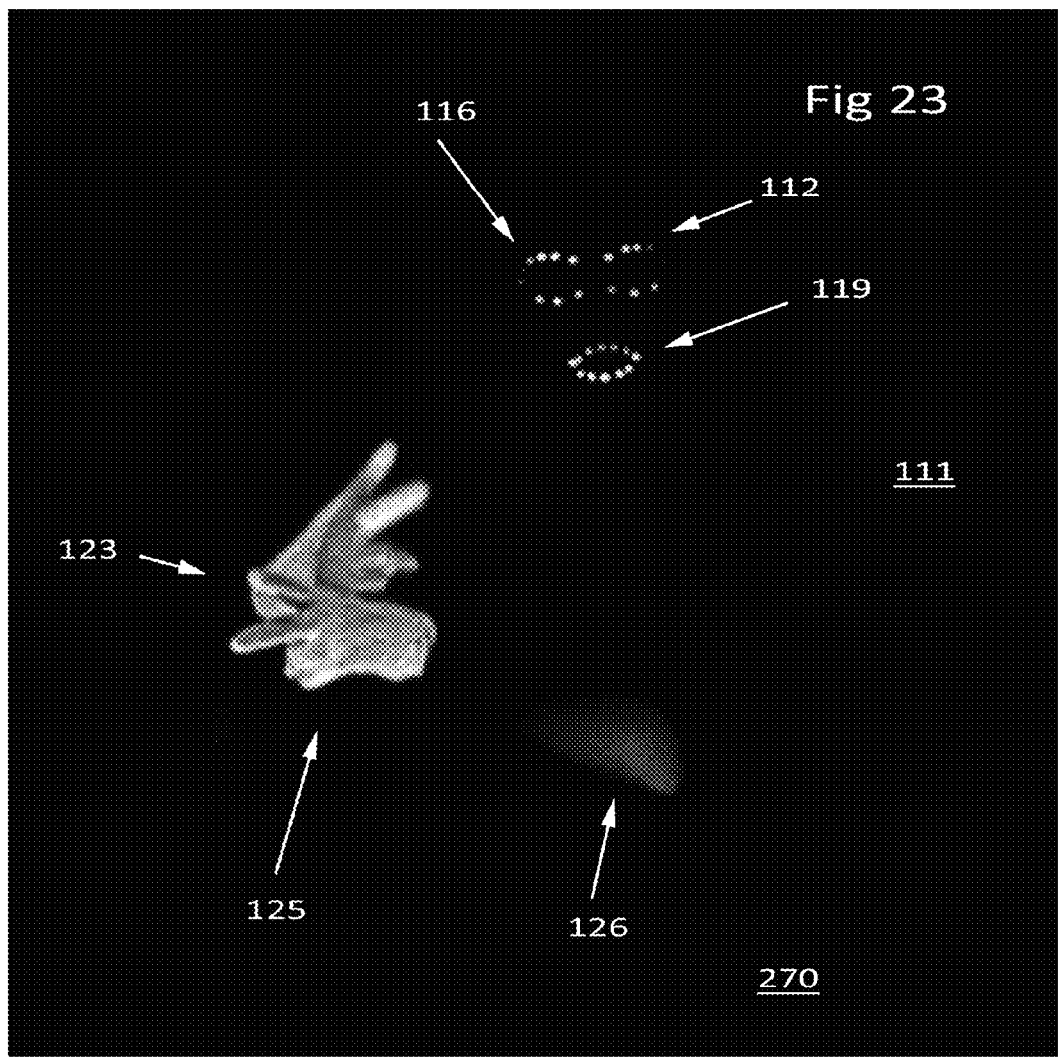
FIG. 23 shows an image of the present invention using visual markers to represent a slice in time of the sign for "watch out"

FIG. 23 is another image 270 in accordance with the teaching of the present invention. The image 120 represents information in the form of a slice in time of the sign "watch out" in Quebec sign language.

Figure 24:
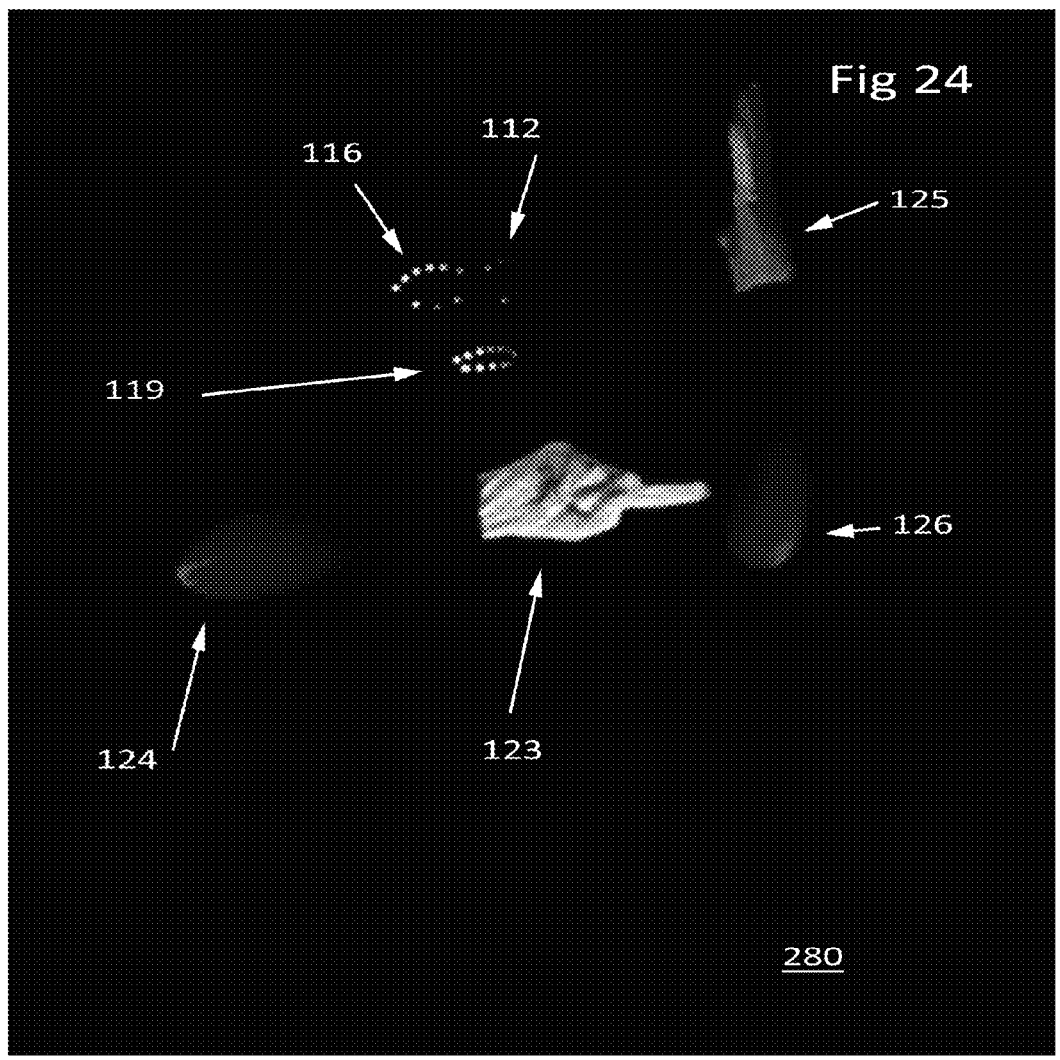
FIG. 24 shows an image of the present invention using visual markers to represent a slice in time of the sign for "maple tree"
Figure 25:
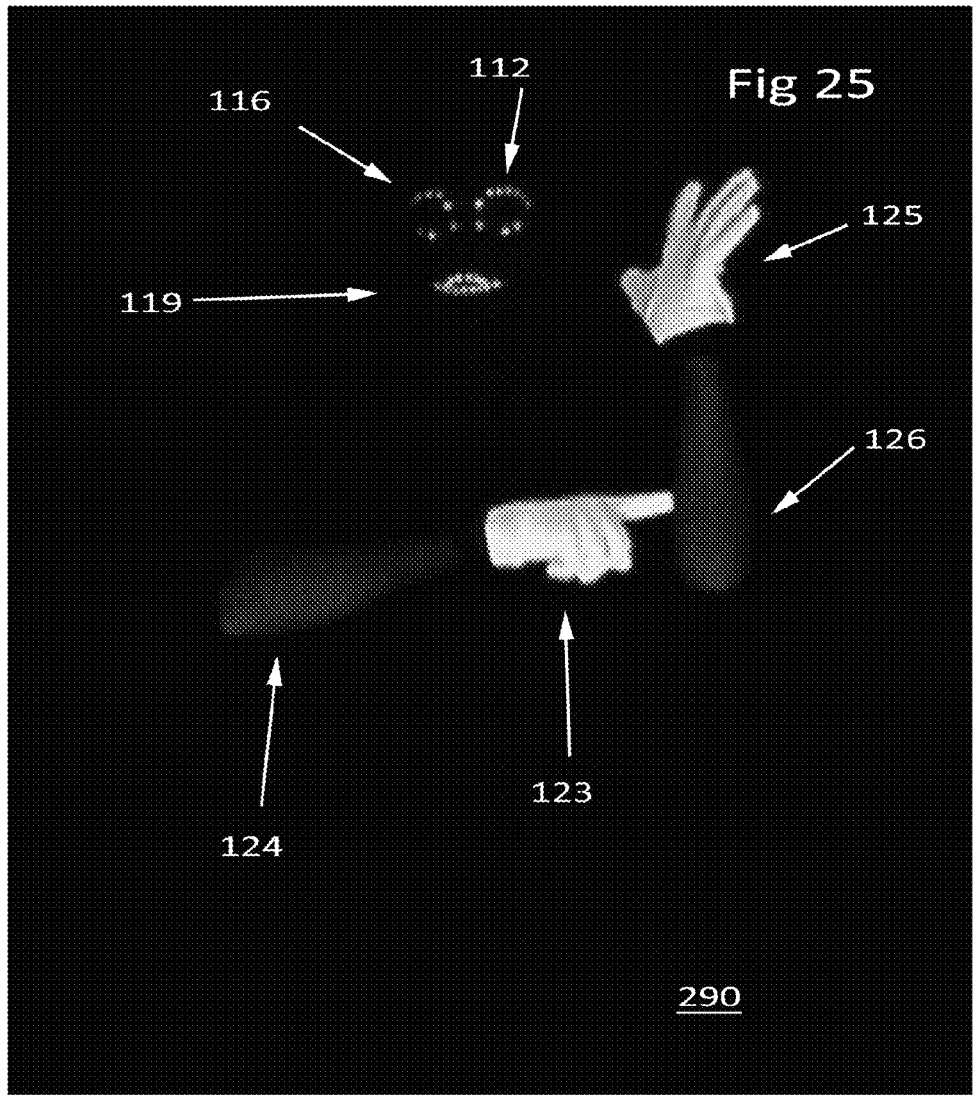
FIG. 25 shows an image of the present invention using visual markers to represent a later slice in time of the sign "maple tree"

FIG. 24 is another image 280 in accordance with the teaching of the present invention. The image 280 represents information in the form of a slice in time of the sign "maple tree" in Quebec sign language. FIG. 25 is another image 290 in accordance with the teaching of the present invention. The image 290 represents information in the form of a slice in time of the sign "maple tree" in Quebec sign language after the moment in time of the image 280 in FIG. 24. In order to represent the entire sign "maple tree" using the present invention, the images 280 and 290, along with other images as necessary, would be shown one after another. It should be noted that as between images 280 and 290 the size, shape and brightness of the visual forearm markers 124 and 126 have varied, to assist the viewing in extrapolating the motion of the forearms of the anonymous interpreter.

It should be noted from viewing the FIGS. 5-25, that a viewer can easily perceive the different and varying head positions, facial expressions, and hand positions and orientations (among other things) of the extrapolated human.

Referring to FIGS. 26-29, the aforementioned images were created in the following manner. A structure having a frame 300 large enough for a human to stand and move around in it was created. The frame 300 was made of segments of 2" PVC tubing appropriately affixed together. The frame 300 was then covered with a material 302 having a reflective interior surface interior surface (i.e. the surfaces facing towards the center of the structure) to ensure optimum light diffusion in the interior of the structure, leaving a viewing opening (not labelled but shown in FIG. 29) open. The frame 200 was further covered with an additional opaque membrane, not labelled but shown in FIG. 29, so as to prevent possible contamination by exterior light of undesired wavelengths. Part of the interior surface opposite (i.e. across from) the opening was covered with a non-reflective material 304. Black lights 306 (i.e. lights emitting light in the ultraviolet and violet range of the visible spectrum) were then secured to the frame 300 in various locations such that the entire interior of the structure was bathed in black light. A digital video camera 308 was then placed in front of the frame 300 so as to be able to record the interior with the non-reflective material serving as the background for the future recordings.

Figure 26:
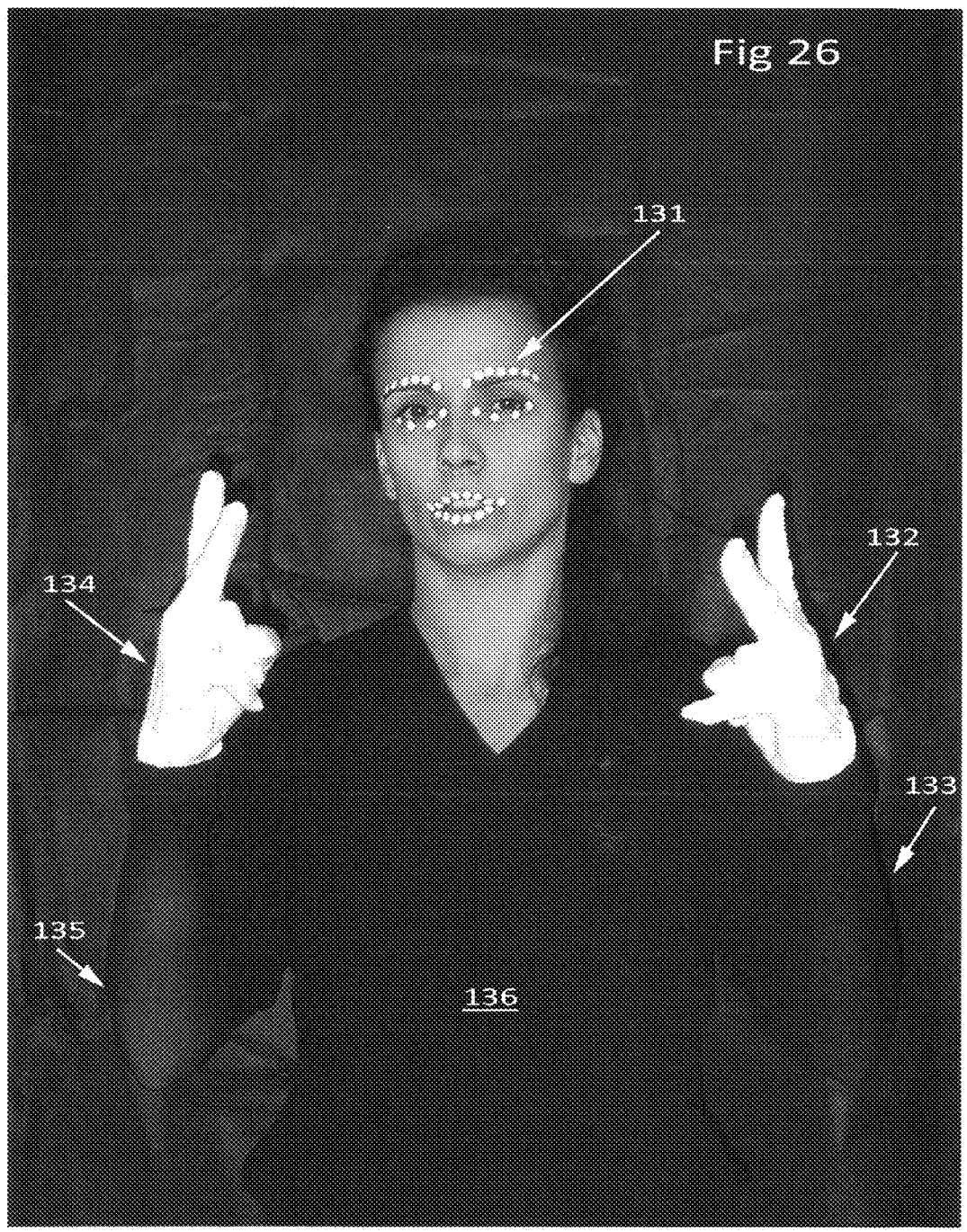
FIG. 26 shows a professional sign language interpreter dressed and marked to make images of the present invention.
Figure 27:
FIG. 27 shows a frame member of a structure used to make images of the present invention.
Figure 28:
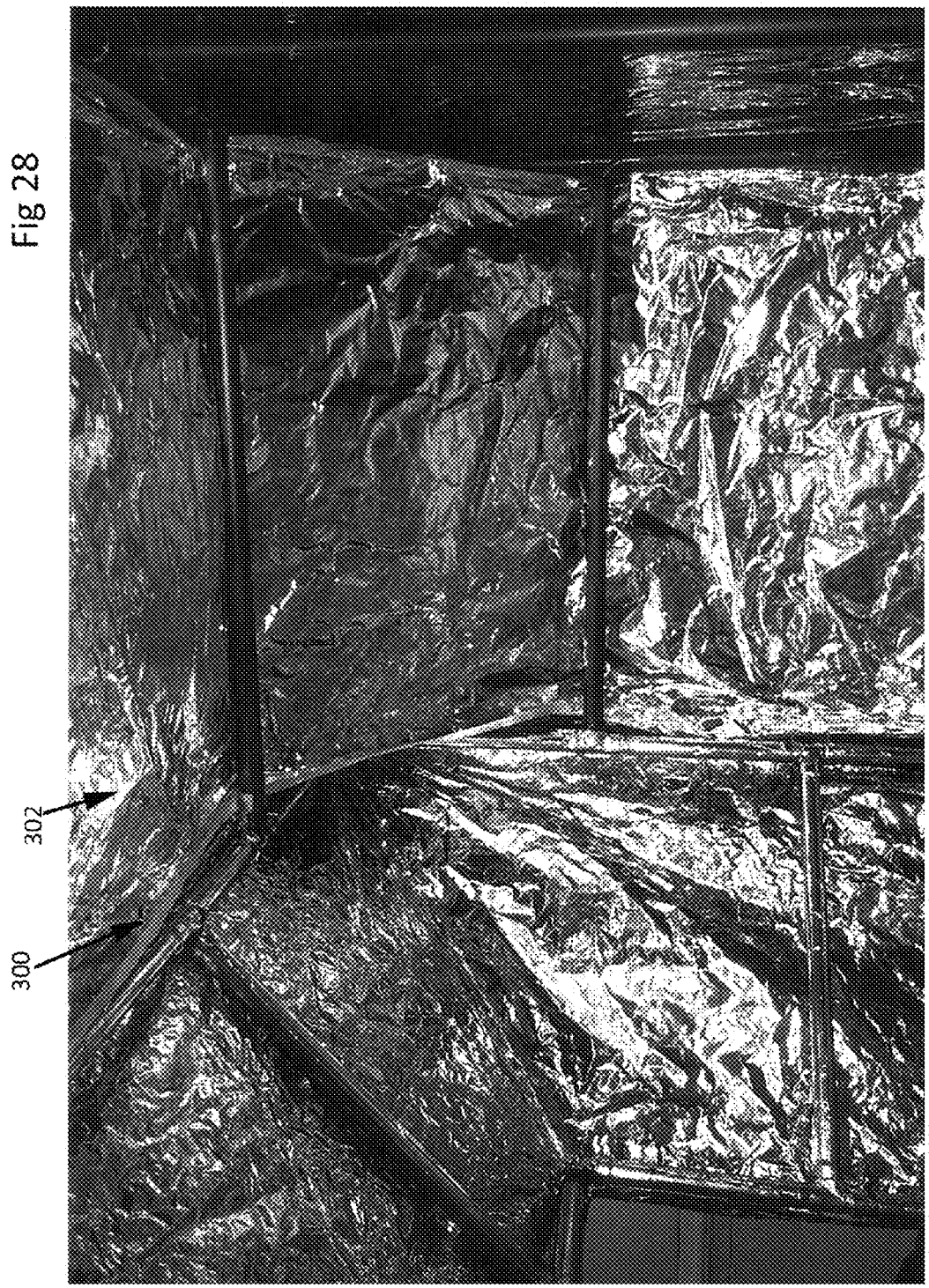
FIG. 28 shows an interior view of the frame member of FIG. 27 having an inner reflective sheeting placed thereon.
Figure 29:
FIG. 29 shows an exterior view of the frame member of FIG. 28 having an outer opaque sheeting thereon.

Referring particularly to FIG. 26, a professional sign language interpreter 136 was dressed all in black with the exception of white wrist-less gloves 132 and 134 and specially constructed material on her forearms 133 and 135. The material 133 and 135 is a combination of a wide spectrum fluorescent reflective surface covered by a fine and tightly knitted opaque mesh of a thickness so as to allow light reflection only from a small range of directions ranging from perpendicular to a few degrees from perpendicular. Also the amount of light that is reflected decreases as the angle of incidence increases away from perpendicular. In addition individual white pieces of material 131 were stuck to the interpreter's face in the area around each of her eyes and her mouth.

The interpreter 136 then entered the frame 300 of the structure and the lights in the room in which the structure was located were turned off, leaving the interpreter illuminated by the aforementioned black lights. The interpreter 136 was then captured on video while she was signing. The video images were stored in digital format on the memory of the camera and then transferred to a secure personal computer where they could be manipulated as with any other digital image.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method for representing information so as to be perceivable by a hearing-impaired person comprising:
producing a succession of viewable images using a computer, a motion picture camera or a video camera, the viewable images comprising predetermined visual markers representative of portions of a human body minimally necessary to communicate with the person via sign language, the visual markers, when viewed by the person, causing the person to extrapolate at least a portion of a human body involved in said sign language, the visual markers selected from the group including
visual eye markers causing the person to extrapolate human eyes and their state and relative orientation with respect to the extrapolated human body,
visual mouth markers causing the person to extrapolate a human mouth and its state and relative orientation with respect to the extrapolated human body,
visual hand markers causing the person to extrapolate human hands and their state and their orientation and position with respect to each other and the extrapolated human body, and
visual forearm markers causing the person to extrapolate human forearms and their relative orientation and position with respect to the extrapolated human body,
wherein the visual eye markers are a left visual eye marker and a right visual eye marker, the left and the right visual eye markers each including a first series of discrete marks placed along a upper-eye-shaped curve and a second series of discrete marks placed along a lower-eye-shaped curve associated with the upper-eye-shaped curve, the upper- and lower-eye-shaped curves being shaped appropriately to the one of a right eye and a left eye that is being represented;
a remainder of the image being visually silent with respect to the person; and
causing the viewable images to be displayed on a display device, the images, when displayed, one after another on the display device, representing information perceivable by the person via sign language.

2. The method of claim 1, wherein each of the first series of discrete marks has between 3 and 8 discrete marks and each of the second series of discrete marks has been 2 and 6 marks.

3. The method of claim 1, wherein the person is caused to extrapolate the relative orientation and position of the extrapolated forearms with respect to the extrapolated human body via a variance, at least between some images, in at least one of size, shape, brightness, color, and contrast, of the visual forearm markers.

4. The method of claim 1, wherein the visual forearm markers are each elbow-less.

5. The method of claim 1, wherein, at least between some viewable images, the visual markers present in each image varies between the images.

6. A method for representing information so as to be perceivable by a hearing-impaired person comprising:

producing a succession of viewable images using a computer, a motion picture camera or a video camera, the viewable images comprising predetermined visual markers representative of portions of a human body minimally necessary to communicate with the person via sign language, the visual markers, when viewed by the person, causing the person to extrapolate at least a portion of a human body involved in said sign language, the visual markers selected from the group including visual eye markers causing the person to extrapolate human eyes and their state and relative orientation with respect to the extrapolated human body, visual mouth markers causing the person to extrapolate a human mouth and its state and relative orientation with respect to the extrapolated human body, visual hand markers causing the person to extrapolate human hands and their state and their orientation and position with respect to each other and the extrapolated human body, and visual forearm markers causing the person to extrapolate human forearms and their relative orientation and position with respect to the extrapolated human body, wherein the visual mouth marker includes a third series of discrete marks placed along a upper-mouth-shaped curve and a fourth series of discrete marks placed along a lower-mouth-shaped curve associated with the upper-mouth-shaped curve;

a remainder of the image being visually silent with respect to the person; and causing the viewable images to be displayed on a display device, the images, when displayed, one after another on the display device, representing information perceivable by the person via sign language.

7. The method of claim 6, wherein each of the third series of discrete marks and the fourth series of discrete marks has between 3 and 10 marks.

8. The method of claim 6, wherein the visual mouth marker includes a visual tongue marker.

9. The method of claim 6, wherein the visual hand markers are a left visual hand marker and a right visual hand marker, the left and the right visual hand markers being surfaces shaped in the form of a human hand appropriate to the one of a right hand and a left hand that is being represented.

10. The method of claim 9, wherein the left and the right visual hand makers are each wrist-less.

11. The method of claim 6, wherein a visual indicator is provided when one of the visual hand markers contacts the extrapolated human body.

12. The method of claim 6, wherein the visual silence of the remainder of the image is achieved by the extrapolated human body being identical in color to a background color of the image.

13. The method of claim 12, wherein the color is black.

14. The method of claim 13, wherein the visual markers are blue-green in color.

15. The method of claim 6, wherein said producing comprises positioning a plurality of visual markers on at least one movable body portion of an interpreter, the movable body portion being selected for effectively communicating an information via sign language and capturing with a camera a succession of viewable images of said interpreter while communicating using sign language, said images emphasizing said plurality of visual markers while de-emphasizing said interpreter.

16. The method of claim 6, wherein said producing comprises generating with a computer a succession of marker graphical images defining a plurality of viewable markers each being visually indicative of a movable body portion of an interpreter, the movable body portion being selected for effectively communicating an information via sign language.

17. The method of claim 6, wherein said producing comprises generating with a computer a succession of human graphical images defining at least in part a human body that is visually indicative of an interpreter and processing the human graphical images by positioning a plurality of viewable markers on at least one movable body portion of the interpreter and by emphasizing the plurality of viewable markers and de-emphasizing the interpreter, the movable body portion being selected for effectively communicating an information via sign language.

18. A method for representing information so as to be perceivable by a hearing-impaired person comprising:

producing a succession of viewable images using a computer, a motion picture camera or a video camera, the viewable images comprising predetermined visual markers representative of portions of a human body minimally necessary to communicate with the person via sign language, the visual markers, when viewed by the person, causing the person to extrapolate at least a portion of a human body involved in said sign language, the visual markers selected from the group including visual eye markers causing the person to extrapolate human eyes and their state and relative orientation with respect to the extrapolated human body, visual mouth markers causing the person to extrapolate a human mouth and its state and relative orientation with respect to the extrapolated human body, visual hand markers causing the person to extrapolate human hands and their state and their orientation and position with respect to each other and the extrapolated human body, and visual forearm markers causing the person to extrapolate human forearms and their relative orientation and position with respect to the extrapolated human body, wherein: the visual hand markers are a left visual hand marker and a right visual hand marker, the left and the right visual hand markers being surfaces shaped in the form of a human hand appropriate to the one of a right hand and a left hand that is being represented; the visual mouth marker includes a third series of discrete marks placed along a upper-mouth-shaped curve and a fourth series of discrete marks placed along a lower-mouth-shaped curve associated with the upper-mouth-shaped curve; and the visual eye markers are a left visual eye marker and a right visual eye marker, the left and the right visual eye markers each including a first series of discrete marks placed along a upper-eye-shaped curve and a second series of discrete marks placed along a lower-eye-shaped curve associated with the upper-eye-shaped curve, the upper- and lower-eye-shaped curves being shaped appropriately to the one of a right eye and a left eye that is being represented;

a remainder of the image being visually silent with respect to the person; and causing the viewable images to be displayed on a display device, the images, when displayed, one after another on the display device, representing information perceivable by the person via sign language.

19. A non-transitory machine-readable medium having machine-executable instructions for performing a method as recited in claim 6.

20. A system comprising a non-transitory machine-readable medium as recited in claim 19 and a display device operatively connected thereto.

* * * * *